US010680469B2

(12) United States Patent
Azancot et al.

(10) Patent No.: US 10,680,469 B2
(45) Date of Patent: Jun. 9, 2020

(54) SYSTEM AND METHOD FOR CODED COMMUNICATION SIGNALS REGULATING INDUCTIVE POWER TRANSMISSIONS

(71) Applicant: POWERMAT TECHNOLOGIES, LTD., Neve Ilan (IL)

(72) Inventors: Yossi Azancot, Jerusalem (IL); Arik Rofe, Jerusalem (IL); Oola Greenwald, Mevasseret Zion (IL); Amir Ben-Shalom, Modiin (IL); Moti Asheri, Jerusalem (IL); Alfred Leibovitz, Petach Tikva (IL)

(73) Assignee: POWERMAT TECHNOLOGIES, LTD., Petach Tikva (IL)

( * ) Notice: Subject to any disclaimer, the term of this patent is extended or adjusted under 35 U.S.C. 154(b) by 0 days.

(21) Appl. No.: 16/053,126

(22) Filed: Aug. 2, 2018

(65) Prior Publication Data
US 2018/0342908 A1    Nov. 29, 2018

Related U.S. Application Data

(60) Continuation of application No. 14/740,108, filed on Jun. 15, 2015, now abandoned, which is a continuation of application No. 14/306,123, filed on Jun. 16, 2014, now Pat. No. 9,099,894, which is a division of application No. 13/205,672, filed on Aug.
(Continued)

(51) Int. Cl.
*H02J 50/80* (2016.01)
*H02J 50/12* (2016.01)
*H02J 7/02* (2016.01)
*H02J 5/00* (2016.01)
*H01F 38/14* (2006.01)
*H04B 5/00* (2006.01)
(Continued)

(52) U.S. Cl.
CPC ............. *H02J 50/80* (2016.02); *H01F 38/14* (2013.01); *H02J 5/005* (2013.01); *H02J 7/025* (2013.01); *H02J 50/12* (2016.02); *H04B 5/0037* (2013.01); *H01F 2038/143* (2013.01); *H02M 3/3376* (2013.01); *H02M 2007/4815* (2013.01); *Y02B 70/1433* (2013.01); *Y02B 70/1441* (2013.01)

(58) Field of Classification Search
CPC .................................. H02J 50/10; H02J 50/12
See application file for complete search history.

(56) References Cited

U.S. PATENT DOCUMENTS 6,118,249 A * 9/2000 Brockmann ............ H02J 7/025
                                                                 320/108
6,636,146 B1    10/2003 Wehoski
(Continued)

FOREIGN PATENT DOCUMENTS

JP    H09103037 A    4/1997

*Primary Examiner* — Daniel J Cavallari
(74) *Attorney, Agent, or Firm* — William Dippert; Laurence Greenberg; Werner Stemer

(57) ABSTRACT

An inductive power outlet for wirelessly powering a power receiver is presented that comprises a voltage peak detector that is configured to detect voltage changes that are indicative of increase in a system resonant frequency. The inductive power outlet is configured to respond to detected voltage changes by shutting down or issuing a warning, and the voltage peak detector is further used to detect communication signals initiated by the power receiver to the power outlet.

2 Claims, 13 Drawing Sheets

Related U.S. Application Data 9, 2011, now Pat. No. 8,981,598, which is a continuation-in-part of application No. 12/497,088, filed on Jul. 2, 2009, now Pat. No. 8,188,619.

(60) Provisional application No. 61/129,526, filed on Jul. 2, 2008, provisional application No. 61/129,859, filed on Jul. 24, 2008.

(51) Int. Cl.
*H02M 3/337* (2006.01)
*H02M 7/48* (2007.01)

(56) References Cited

U.S. PATENT DOCUMENTS

| | | | | |
|---|---|---|---|---|
| 2005/0068019 | A1* | 3/2005 | Nakamura | G06F 1/26 323/355 |
| 2007/0042729 | A1* | 2/2007 | Baaman | H02J 50/12 455/127.1 |
| 2007/0216392 | A1* | 9/2007 | Stevens | H02J 50/40 323/355 |
| 2008/0197802 | A1 | 8/2008 | Onishi et al. | |
| 2013/0039395 | A1 | 2/2013 | Norconk et al. | |

* cited by examiner

SYSTEM AND METHOD FOR CODED COMMUNICATION SIGNALS REGULATING INDUCTIVE POWER TRANSMISSIONS

CROSS-REFERENCE TO RELATED APPLICATIONS

This application is a continuation of co-pending U.S. patent application Ser. No. 14/740,108, filed Jun. 15, 2015, which in turn is a continuation of U.S. patent application Ser. No. 14/306,123, filed Jun. 16, 2014, now U.S. Pat. No. 9,099,894, issued Aug. 4, 2015, which is a divisional of U.S. patent application Ser. No. 13/205,672, filed Aug. 9, 2011, now U.S. Pat. No. 8,981,598, issued Mar. 17, 2015, which is a continuation-in-part of U.S. patent application Ser. No. 12/497,088, filed Jul. 2, 2009, now U.S. Pat. No. 8,188,619, issued May 29, 2012, which, in turn, claims the benefit of the priority dates of U.S. Provisional Patent Application Ser. No. 61/129,526, filed Jul. 2, 2008 and Ser. No. 61/129,859, filed Jul. 24, 2008, the disclosures of all of which are hereby incorporated herein by reference in their entirety.

TECHNICAL FIELD

The present invention is directed to providing energy efficient inductive power transfer. More specifically, the present invention relates to inductive power transfer systems and methods incorporating activation and termination mechanisms.

BACKGROUND

The efficient use of available energy is of great importance for a number of reasons. On a global scale, there is increasing concern that the emission of greenhouse gases such as carbon dioxide from the burning of fossil fuels may precipitate global warming. Moreover, energy resources are limited. The scarcity of global energy resources alongside geopolitical factors drives the cost of energy upwards. Thus efficient use of energy is an ever more important budget consideration for the energy consumer.

Energy losses in electrical energy transmission are chiefly due to the incidental heating of current carrying wires. In many cases this is unavoidable, as current carrying wires are essential for the powering of electrical devices and current carrying wires have resistance. It is the work done to overcome this resistance which generates heat in the wires.

In other cases the energy losses are unnecessary. For example, electrical devices are often left running unnecessarily and energy used to power devices which are not being used is truly wasted. Various initiatives aimed at reducing the amount of energy wasted by idle devices have been proposed. For example, Energy Star is a joint program of the United States Environmental Protection Agency and the United States Department of Energy which awards manufacturers the right to display a recognizable label on products which meet certain energy consumption standards. Energy Star attempts to reduce energy consumption through better energy management.

Efficient energy management reduces energy wastage. For example, laptop computers, which rely upon a limited amount of energy supplied from onboard power cells, use a variety of strategies for keeping power consumption to a minimum. Thus the screen and hard drives are switched off automatically after the computer has been left inactive for a significant length of time, similarly the network card may be disabled when the computer is disconnected from the mains or from a network. Such energy management strategies may serve to increase the length of time that a device can be powered by its onboard cells.

Even when connected to the mains, however, efficient use of energy is essential. Many common electrical devices run on low voltage DC and typically use a transformer with an AC-DC power adapter to control the power provided to it. Energy Star estimates that 1.5 billion such power adapters are used in the United States alone for devices such as MP3 players, Personal Digital Assistants (PDAs), camcorders, digital cameras, emergency lights, cordless and mobile phones. According to Energy Star, such power adapters draw about 300 billion kilowatt-hours of energy every year which is approximately 11% of the United States' national electric bill.

If multiple devices could be run from a single power adapter this would greatly reduce the number of power adapters in use. However, the supply of electricity to a number of devices through a single cable is not trivial. The more devices that are connected to a single power strip the greater the current which is drawn by the strip. Thus the current supplied through the single cable connecting the power strip to the mains increases.

Power losses due to the heating of a cable increase according to the square of the current it carries so energy losses from the cable may increase parabolically. Furthermore, in the absence of effective energy management, if too many devices draw current from a single cable the current supplied may exceed the permitted level thereby tripping a circuit breaker or blowing a fuse. Even more seriously, the excessive current may lead to overheating of the cable which is a common cause of fire.

A further unnecessary usage of energy is in powering of devices having onboard power cells. When an electric device having rechargeable cells such as a laptop computer, electric shaver or the like, is connected to the mains power is drawn both to operate the device and also to recharge the cells. Although electrical cells do need to be recharged periodically, even partially charged cells are sufficient to power the device. It is unnecessary therefore to continuously charge the onboard cell.

Furthermore, the energy needlessly consumed charging electrical cells beyond the level necessary for operation of a device increases electricity bills. This is of particular concern where a large number of such devices are being used simultaneously. For example for a company which hosts a meeting or a conference where many individual laptop computers are being used simultaneously.

Inductive power coupling allows energy to be transferred from a power supply to an electric load without a wired connection therebetween. An oscillating electric potential is applied across a primary inductor. This sets up an oscillating magnetic field in the vicinity of the primary inductor. The oscillating magnetic field may induce a secondary oscillating electrical potential in a secondary inductor placed close to the primary inductor. In this way, electrical energy may be transmitted from the primary inductor to the secondary inductor by, electromagnetic induction without a conductive connection between the inductors.

When electrical energy is transferred from a primary inductor to a secondary inductor, the inductors are the to be inductively coupled. An electric load wired in series with such a secondary inductor may draw energy from the power source wired to the primary inductor when the secondary inductor is inductively coupled thereto.

The strength of the induced voltage in the secondary inductor varies according to the oscillating frequency of the electrical potential provided to the primary inductor. The induced voltage is strongest when the oscillating frequency equals the resonant frequency of the system. The resonant frequency $f_R$ depends upon the inductance L and the capacitance C of the system according to the equation $$f_R = \frac{1}{2\pi\sqrt{LC}}.$$

Known inductive power transfer systems typically transmit power at the resonant frequency of the inductive couple. This can be difficult to maintain as the resonant frequency of the system may fluctuate during power transmission, for example in response to changing environmental conditions or variations in alignment between primary and secondary coils.

Amongst others, one problem associated with resonant transmission is the high transmission voltages involved. At high operating voltages, a large amount of heat may be generated by the system resulting in high power losses as well as damage to heat sensitive components. Accordingly, capacitors and transistors in the resonant circuits may need to be relatively large.

The need remains therefore for an energy efficient inductive power transfer system which may incur lower power losses during operation. The current disclosure addresses this need.

SUMMARY

According to one aspect of the disclosure an inductive power outlet is presented for transmitting power to at least one inductive power receiver. The inductive power outlet comprises at least one primary inductor wired to a power supply, the primary inductor for forming an inductive couple with at least one secondary inductive coil associated with the inductive power receiver; and at least one driver configured to provide an oscillating voltage across the primary inductor.

The inductive power receiver may comprise the at least one secondary inductive coil; and an output regulator operable to monitor induced voltage across the secondary inductive coil; to detect an activation voltage pulse; to compare the induced voltage with at least one threshold value; to send at least one instruction signal to the inductive power outlet; and to provide power to an electric load.

The inductive power outlet may be operable to induce an activation voltage pulse across the secondary inductive coil of the inductive power receiver thereby initiating the inductive power receiver to send an identification signal to the inductive power outlet and to start drawing power therefrom.

Optionally, the inductive power receiver further comprises a signal transmission circuit operable to generate the at least one instruction signal. The transmission circuit may comprise at least one ancillary load selectively connectable to the secondary inductor by a switching unit, wherein the switching unit is configured to connect the ancillary load to the secondary inductor with a characteristic frequency thereby producing a pulse of detectable peaks in primary voltage or primary current having the characteristic frequency.

Optionally, the at least one instruction signal comprising a pulse may have a characteristic frequency of peaks in primary voltage or primary current, wherein the inductive power outlet further comprises: at least one peak detector configured to detect the peaks; and at least one processor operable to determine the characteristic frequency of the peaks.

In other embodiments, the outlet further comprises a signal detector operable to detect the instruction signals and the driver is operable to perform at least one function selected from a group consisting of:

selecting a first operating power if the signal detector detects a first instruction signal;
selecting a second operating power if the signal detector detects a second instruction signal;
increasing operating power by a first increment if the signal detector detects a third instruction signal;
increasing operating power by a second increment if the signal detector detects a fourth instruction signal;
decreasing operating power by a first increment if the signal detector detects a fifth instruction signal;
decreasing operating power by a second increment if the signal detector detects a sixth instruction signal;
continuing to provide the oscillating voltage across the primary inductor at same power if the signal detector detects a seventh instruction signal; and
ceasing to provide the oscillating voltage across the primary inductor if the signal detector detects an eighth instruction signal.

The inductive power outlet may further comprise a trigger sensor configured to detect a release signal indicating proximity of a possible inductive power receiver.

Optionally, the activation voltage pulse comprises an induced voltage across the secondary inductive coil of at least eight volts. Where appropriate, the activation voltage pulse produces a current of at least three milliamps.

According to a further aspect of the disclosure an inductive power receiver is presented for receiving power from at least one inductive power outlet. The inductive power receiver may comprise at least one secondary inductor for forming an inductive couple with at least one primary inductive coil; and at least one signal transmission circuit configured to generate at least one instruction signal, the instruction signal being detectable by a signal detector associated with the inductive power outlet as a pulse having a characteristic frequency of peaks in primary voltage or primary current. Where required, the inductive power outlet may be configured to drive an oscillating voltage across the primary inductive coil for a limited time duration and to stop driving the oscillating voltage if no instruction signal is received during the time duration; and the transmission circuit may be operable to send at least one instruction signal to the inductive power outlet during each the time duration.

Optionally, the time duration is between five milliseconds and ten milliseconds.

In some embodiments, at least one instruction signal comprises a termination signal and the inductive power outlet is operable to cease driving the primary inductive coil when the termination signal is detected.

Where appropriate, the transmission circuit may comprise a signal generator operable to generate at least one instruction signal having a characteristic frequency selected from at least one of a group consisting of: 250 hertz, 500 hertz, 1 kilohertz, from 1.5 kilohertz to 5 kilohertz and 8 kilohertz.

Optionally, the inductive power receiver further comprises an output regulator operable to monitor induced voltage across the secondary inductor; to compare the induced voltage with at least one threshold value; and to provide power to an electric load. The output regulator may be further operable to generate at least one instruction signal selected from a group consisting of:

an initial pulse of approximately one kilohertz to instruct the inductive power outlet to drive the primary inductive coil at a first operating power;

an initial pulse of approximately 8 kilohertz to instruct the inductive power outlet to drive the primary inductive coil at a second operating power;

a pulse of approximately one kilohertz to instruct the inductive power outlet to increase operating power by a first increment;

a pulse of between approximately 1.5 kilohertz and approximately 5 kilohertz to instruct the inductive power outlet to increase operating power by a second increment;

a pulse of approximately 8 kilohertz to instruct the inductive power outlet to decrease operating power by a first increment;

a pulse of approximately 500 hertz to instruct the inductive power outlet to continue driving the primary inductive coil at the same power; and a pulse of approximately 250 hertz to instruct the inductive power outlet to cease driving the primary inductive coil.

In another aspect of the disclosure, a method is taught for transferring power inductively comprising: obtaining an inductive power outlet comprising: at least one primary inductor, at least one driver and at least one instruction signal detector; obtaining an inductive power receiver comprising: at least one secondary inductor and at least one instruction signal generator; driving the primary inductor for a limited time duration; monitoring the signal detector; if at least one instruction signal is detected by the instruction signal detector during the time duration, then repeating steps of driving the primary inductor and monitoring the signal detector; and if no instruction signal is received during the time duration, then terminating the driver. Optionally, the time duration is between five milliseconds and ten milliseconds.

Variously, the method may further comprise at least one of:

if the instruction signal detector detects a termination signal, then terminating the driver;

if the instruction signal detector detects a perpetuation signal, then continuing to drive the primary inductor with the same power;

if the instruction signal detector detects a first increase power signal, then increasing power by a first incremental value;

if the instruction signal detector detects a second increase power signal, then increasing power by a second incremental value; and if the instruction signal detector detects a decrease power signal, then decreasing power by an incremental value.

Where appropriate, the instruction signal generator comprises a signal transmission circuit operable to draw additional power from the secondary inductive coil thereby generating detectable peaks in primary voltage or primary current. Optionally, the instruction signal detector comprises at least one peak detector configured to detect peaks in primary voltage or primary current; and at least one processor operable to determine the characteristic frequency of the peaks;

Additionally or alternatively, the method may further comprise at least one of:

if the peak detector initially detects peaks in primary voltage or primary current having a first characteristic frequency then the driver operating at a first operating power;

if the peak detector initially detects peaks in primary voltage or primary current having a second characteristic frequency then the driver operating at a second operating power;

if the peak detector detects peaks in primary voltage or primary current having a third characteristic frequency then the driver increasing operating power by a first increment;

if the peak detector detects peaks in primary voltage or primary current having a fourth characteristic frequency then the driver increasing operating power by a second increment;

if the peak detector detects peaks in primary voltage or primary current having a fifth characteristic frequency then the driver decreasing operating power by a first increment;

if the peak detector detects peaks in primary voltage or primary current having a sixth characteristic frequency then the driver decreasing operating power by a second increment;

if the peak detector detects peaks in primary voltage or primary current having a seventh characteristic frequency then the driver continuing to operate at same power; and if the peak detector detects peaks in primary voltage or primary current having an eighth characteristic frequency then the driver ceasing to provide the oscillating voltage.

Variously, the characteristic frequency may be selected from at least one of a group consisting of: 250 hertz, 500 hertz, 1 kilohertz, from 1.5 kilohertz to 5 kilohertz, 8 kilohertz or the like.

Other embodiments of the present invention are directed towards providing an inductive power transfer system comprising at least one inductive power outlet comprising at least one primary inductive coil wired to a power supply via a driver; the primary inductive coil for forming an inductive couple with at least one secondary inductive coil wired to an electric load, the secondary inductive coil associated with an inductive power receiver wherein the driver is configured to provide a driving voltage across the primary inductive coil, the driving voltage oscillating at a transmission frequency significantly different from the resonant frequency of the inductive couple. Optionally, the driver comprises a switching unit for intermittently connecting the primary inductive coil to the power supply.

Optionally, the transmission frequency lies within a range in which induced voltage varies approximately linearly with frequency. Optionally, the driver is configured to adjust the transmission frequency in response to the feedback signals.

Optionally, the inductive power outlet comprising a signal detector adapted to detect a first signal and a second signal, and the driver is configured to: increase the transmission frequency when the first signal is detected by the detector, and decrease the transmission frequency when the second signal is detected by the detector. The feedback signals generally carry data pertaining to the operational parameters of the electric load. Operational parameters are selected from the group comprising: required operating voltage for the electric load; required operating current for the electric load; required operating temperature for the electric load; required operating power for the electric load; measured operating voltage for the electric load; measured operating current for the electric load; measured operating temperature for the electric load; measured operating power for the electric load; power delivered to the primary inductive coil; power received by the secondary inductive coil, and a user identification code. Optionally, the detector is selected from the list comprising optical detectors, radio receivers, audio detectors and voltage peak detectors.

Optionally, the driver further comprises a voltage monitor for monitoring the amplitude of a primary voltage across the primary coil. Optionally, the voltage monitor is configured to detect significant increases in primary voltage.

In other embodiments, the driving voltage oscillating at a transmission frequency higher than the resonant frequency of the inductive couple, wherein the primary inductive coil is further wired to a reception circuit comprising a voltage monitor for monitoring the amplitude of a primary voltage across the primary coil, and the secondary inductive coil is further wired to a transmission circuit for connecting at least one electric element to the secondary inductive coil thereby increasing the resonant frequency such that a control signal may be transferred from the transmission circuit to the reception circuit. Optionally, the secondary inductive coil is wired to two inputs of a bridge rectifier and the electric load is wired to two outputs of the bridge rectifier wherein the transmission circuit is wired to one input of the bridge rectifier and one output of the bridge rectifier. Typically, the transmission circuit further comprises a modulator for modulating a bit-rate signal with an input signal to create a modulated signal and a switch for intermittently connecting the electrical element to the secondary inductive coil according to the modulated signal. Optionally, the voltage monitor further comprises a correlator for cross-correlating the amplitude of the primary voltage with the bit-rate signal for producing an output signal.

In certain embodiments, the control signal is for transferring a feedback signal from the secondary inductive coil to the primary inductive coil for regulating power transfer across an inductive power coupling. The driver may be configured to adjust the transmission frequency in response to the feedback signals. Typically, the system is adapted to transfer a first signal and a second signal, and the driver is configured to: increase the transmission frequency when the first signal is received by the receiver, and decrease the transmission frequency when the second signal is received by the receiver.

Variously, embodiments of the invention may be incorporated into at least one application selected from a group consisting of: inductive chargers, inductive power adaptors, power tools, kitchen appliances, bathroom appliances, computers, media players, office equipment, implanted devices, pace makers, trackers and RFID tags inductive chargers, inductive power adaptors It is a further aim of the current invention to teach a method for regulating power transmission inductive from a primary inductive coil, wired to a power supply via a driver, to a secondary inductive coil, wired to an electric load, the method comprising the following steps: (a)—providing an oscillating voltage to the primary inductive coil at an initial transmission frequency ft which is substantially different from the resonant frequency $f_R$ of the system; (b)—inducing a secondary voltage in the secondary inductive coil; (c)—monitoring power received by the electric load; (d)—sending a feedback signal when the monitored power deviates from a predetermined range; (e)—the driver receiving the feedback signal; (f)—the driver adjusting the transmission frequency; and (g)—repeating steps (b)-(f).

Optionally, step (d) further comprises: (d1) sending a feedback signal of a first type $S_a$ to the driver, whenever the power drops below a predetermined lower threshold, and (d2) sending a feedback signal of a second type $S_b$ to the driver, whenever the power exceeds a predetermined upper threshold.

According to preferred embodiments the initial transmission frequency $f_t$ is higher than the resonant frequency $f_R$ and step (f) further comprises: (f1) the driver reducing the transmission frequency by an incremental value—$\delta f_1$ when the received feedback signal is of the first type $S_a$, and (f2) the driver increasing the transmission frequency by an incremental value +$\delta f_2$ when the received feedback signal is of the second type $S_b$.

In still other embodiments, the invention is directed to teaching another method for transferring a signal from a secondary inductive coil to a primary inductive coil of an inductive power transfer system, the method comprising the following steps: Step (i)—connecting the primary inductive coil to a voltage monitor for monitoring the amplitude of a primary voltage across the primary coil; Step (ii)—connecting the secondary inductive coil to a transmission circuit for selectively increasing the resonant frequency of the inductive power transfer system; Step (iii)—providing an oscillating voltage to the primary inductive coil at an initial transmission frequency higher than the resonant frequency thereby inducing a voltage in the secondary inductive coil; Step (iv)—using the transmission circuit to modulate a bit-rate signal with the input signal to create a modulated signal and connecting the electrical element to the secondary inductive coil intermittently according to the modulated signal, and Step (v)—using the voltage monitor to cross-correlate the amplitude of the primary voltage with the bit-rate signal for producing an output signal.

BRIEF DESCRIPTION OF THE FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DESCRIPTION OF THE PREFERRED EMBODIMENTS

Figure 1:
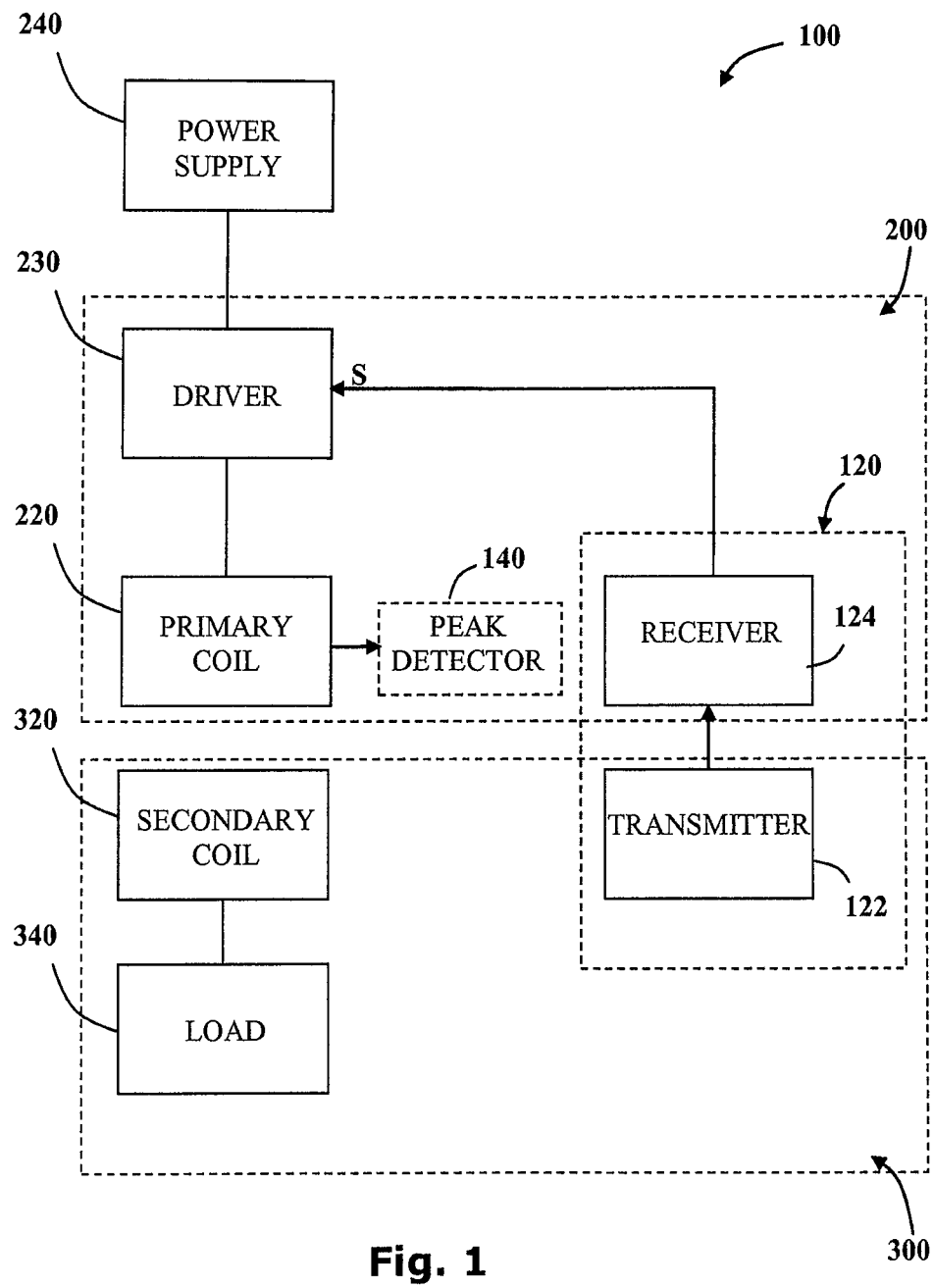
FIG. 1 is a block diagram showing the main elements of an inductive power transfer system with a feedback signal path according to embodiments of the present invention.

Reference is now made to FIG. 1 showing a block diagram of the main elements of an inductive power transfer system 100 adapted to transmit power at a non-resonant frequency according to another embodiment of the invention. The inductive power transfer system 100 consists of an inductive power outlet 200 configured to provide power to a remote secondary unit 300. The inductive power outlet 200 includes a primary inductive coil 220 wired to a power source 240 via a driver 230. The driver 230 is configured to provide an oscillating driving voltage to the primary inductive coil 220.

The secondary unit 300 includes a secondary inductive coil 320, wired to an electric load 340, which is inductively coupled to the primary inductive coil 220. The electric load 340 draws power from the power source 240. A communication channel 120 may be provided between a transmitter 122 associated with the secondary unit 300 and a receiver 124 associated with the inductive power outlet 200. The communication channel 120 may provide feedback signals S and the like to the driver 230.

In some embodiments, a voltage peak detector 140 is provided to detect large increases in the transmission voltage. As will be descried below the peak detector 140 may be used to detect irregularities such as the removal of the secondary unit 200, the introduction of power drains, short circuits or the like.

Figure 2:
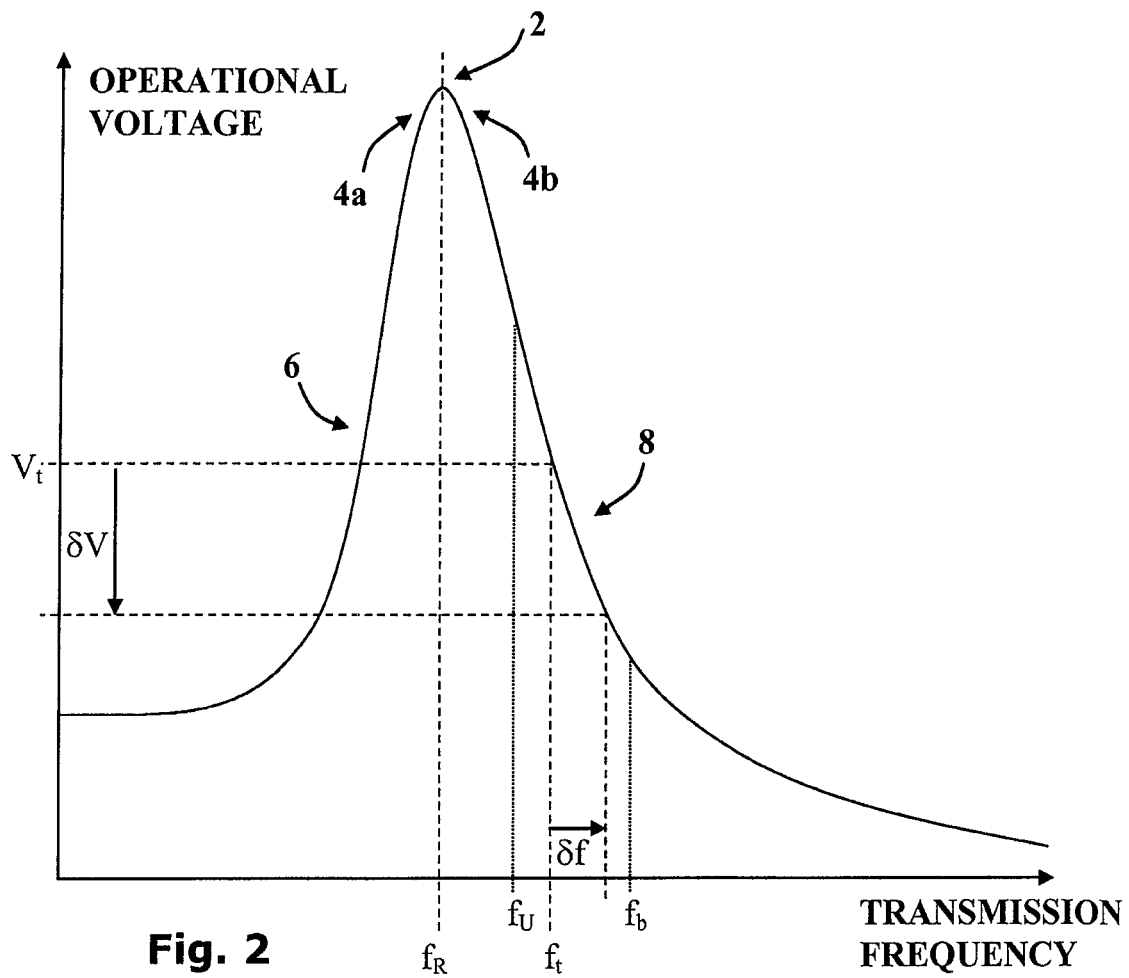
FIG. 2 is a graph showing how the amplitude of operational voltage of an inductive power transfer system varies with transmission frequency.

FIG. 2 is a graph showing how the amplitude of the operational voltage of an inductive power transfer system varies according to the transmission frequency. It is noted that the voltage is at its highest when the transmission frequency is equal to the resonant frequency $f_R$ of the system, this maximum amplitude is known as the resonance peak 2. It is further noted that the slope of the graph is steepest in the regions 4a, 4b to either side of the resonance peak 2. Thus in inductive transfer systems, which operate at or around resonance, a small variation in frequency results in a large change in induced voltage. Similarly, a small change in the resonant frequency of the system results in a large change in the induced voltage. For this reason prior art resonant inductive transfer systems are typically very sensitive to small fluctuations in environmental conditions or variations in alignment between the induction coils.

It is a particular feature of embodiments of the current invention that the driver 230 (FIG. 1) is configured and operable to transmit a driving voltage which oscillates at a transmission frequency which is substantially different from the resonant frequency of the inductive couple. Optionally the transmission frequency is selected to lie within one of the near-linear regions 6, 8 where the slope of the frequency-amplitude graph is less steep.

Figure 3:
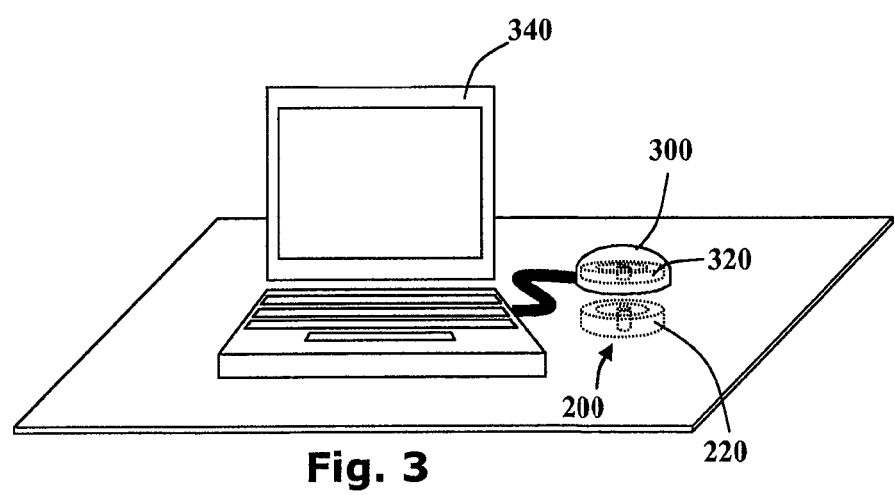
FIG. 3 is a schematic diagram representing a laptop computer drawing power from an inductive power outlet.

One advantage of this embodiment of the present invention may be demonstrated with reference now to FIG. 3. A schematic diagram is shown representing a laptop computer 340 drawing power from an inductive power outlet 200 via a secondary power receiving unit 300. The power receiving unit 300 includes a secondary inductive coil 320 which is aligned to a primary inductive coil 220 in the inductive power outlet 200. Any lateral displacement of the secondary power receiving unit 300 changes the alignment between the secondary inductive coil 320 to the primary inductive coil 220. As a result of the changing alignment, the combined inductance of the coil pair changes which in turn changes the resonant frequency of the system.

If the inductive power outlet 200 transmits power at the resonant frequency of the system, even a small lateral movement would reduce significantly the amplitude of the induced voltage. In contradistinction to the prior art, in embodiments of the present invention the inductive power outlet 200 transmits power at a frequency in one of the regions 6, 8 to either side of the resonance peak 2 (FIG. 2) where the slope of the resonance graph is much shallower. Consequently, the system has a much larger tolerance of variations such as lateral movement.

A further feature of embodiments of inductive power outlets transmitting at frequencies above the natural resonant frequency of the system, is that if the resonant frequency of the system increases for some reasons, then the transmission voltage increases sharply. In preferred embodiments, a peak detector 140 (FIG. 1) is be provided to monitor the transmission voltage of the power outlet 200 and is configured to detect large increases in the transmission voltage indicating an increase in resonant frequency.

Referring again to the resonant formula for inductive systems, $$f_R = \frac{1}{2\pi\sqrt{LC}},$$

it is noted that any decrease in either the inductance L or the capacitance C of the system increases the resonant frequency and may be detected by the peak detector 140.

As an example of the use of a peak detector 140, reference is again made to FIG. 3. It will be appreciated that in a desktop environment, conductive bodies such as a paper clip, metal rule, the metal casing a stapler, a hole-punch or any metallic objects may be introduced between the inductive power outlet 200 and the secondary power receiving unit 300. The oscillating magnetic field produced by the primary coil 220 would then produce eddy currents in the conductive body heating it and thereby draining power from the primary coil 220. Such a power drain may be wasteful and/or dangerous. Power drains such as described above generally reduce the inductance L of the system thereby increasing its resonant frequency.

The inductance L of the system may also be reduced by the removal of the secondary coil 220, the creation of a short circuit or the like. A peak detector 140, wired to the inductive power outlet, may detect any of these scenarios as a large increase in transmission voltage. Where required, the power transfer system may be further configured to shut down, issue a warning or otherwise protect the user and the system in the event that the peak detector 140 detects such an increase in transmission voltage.

Figure 4:
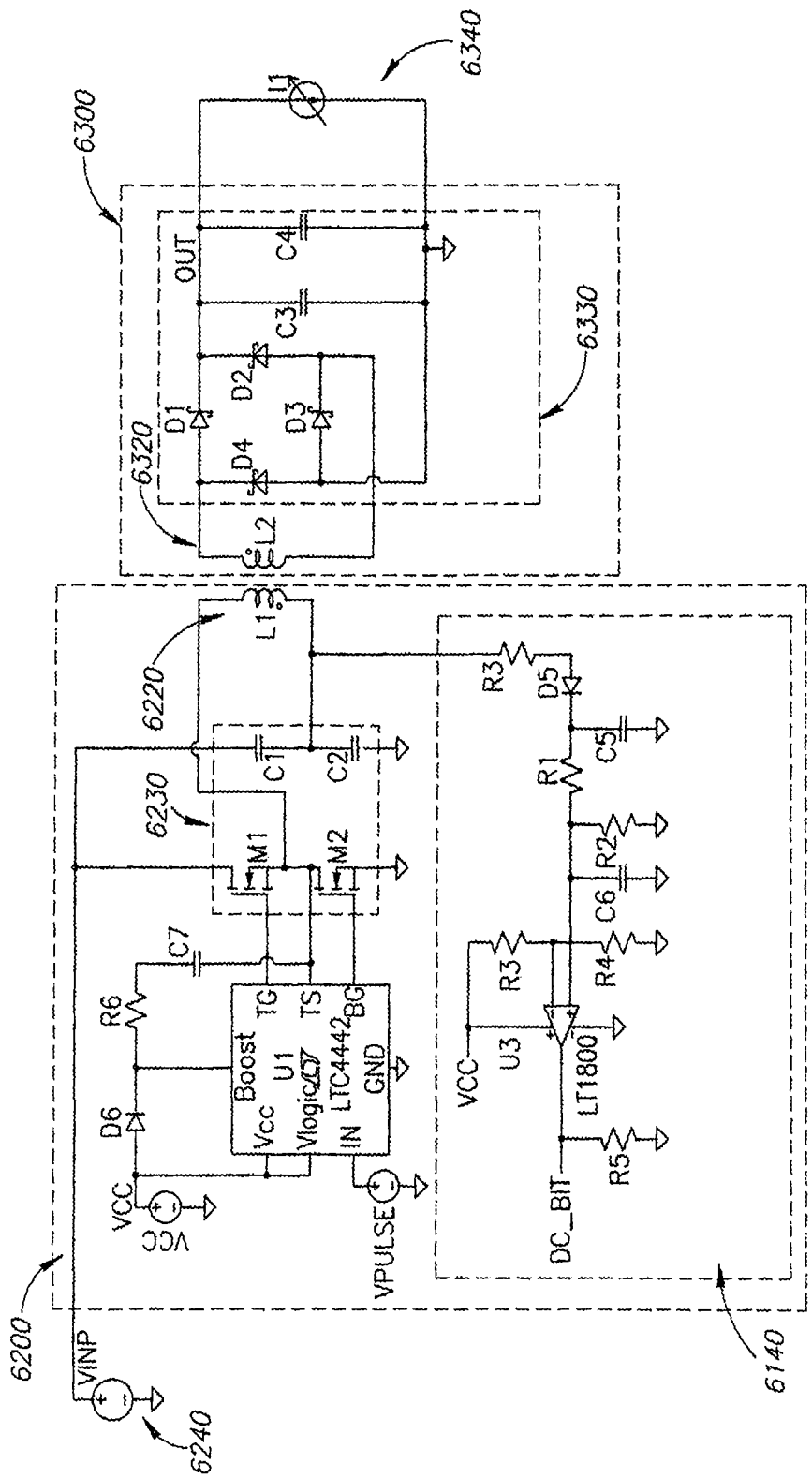
FIG. 4 is a circuit diagram of an inductive power transfer system according to another embodiment of the invention including a peak detector for detecting large increases in transmission voltage.

FIG. 4 is a circuit diagram of an inductive power outlet 6200 and secondary unit 6300. The secondary unit 6300 comprises a secondary coil 6320 wired to an electric load 6340 via a rectifier 6330.

The inductive power outlet 6200 comprises a primary coil 6220 driven by a half-bridge converter 6230 connected to a power source 6240. The half-bridge converter 6230 is configured to drive the primary coil 6220 at a frequency higher than the resonant frequency of the system and a peak detector 6140 is configured to detect increases in the transmission voltage.

Although only a half-bridge converter is represented in FIG. 4, it is noted that other possible driving circuits include: a DC-to-DC converter, an AC-to-DC converter, an AC-to-AC converter, a flyback transformer, a full-bridge converter, a flyback converter or a forward converter for example.

Another advantage of non-resonant transmission is that the transmission frequency may be used to regulate power transfer. Prior art inductive power transfer systems, typically regulate power transfer by altering the duty cycle of the transmission voltage. Unlike prior art systems, because embodiments of the present invention transmit at a frequency not equal to the resonant frequency of the system, the driver 230 may be configured to regulate power transfer by adjusting the transmission frequency.

The regulation is illustrated with reference to FIG. 2. In embodiments of the invention, the frequency of transmission may be selected to be in the approximately linear region 8 of the curve between a lower frequency value of $f_L$ and an upper frequency value of $f_U$. A transmission frequency $f_t$, higher than the resonant frequency $f_R$ of the system, produces an induced voltage of $V_t$. The induced voltage can be increased by reducing the transmission frequency so that it is closer to the resonant frequency $f_R$. Conversely, the induced voltage may be reduced by increasing the transmission frequency so that it is further from the resonant frequency $f_R$. For example, an adjustment of transmission frequency by $\delta f$ produces a change in induced voltage of $\delta V$.

In some embodiments, a communication channel 120 (FIG. 1) is provided between the secondary unit 300 and the inductive power outlet 200 to communicate the required operating parameters. In embodiments of the invention operating parameters the communication channel 120 may be used to indicate the transmission frequency required by the electric load 340 to the driver 230.

The communication channel 120 may further provide a feedback signal during power transmission. The feedback transmission may communicate required or monitored operating parameters of the electric load 240 such as:

required operating voltage, current, temperature or power for the electric load 240, the measured voltage, current, temperature or power supplied to the electric load 240 during operation, the measured voltage, current, temperature or power received by the electric load 240 during operation and the like.

In some embodiments, a microcontroller in the driver 230 may use such feedback parameters to calculate the required transmission frequency and to adjust the driver accordingly. Alternatively, simple feedback signals may be provided indicating whether more or less power is required.

Figure 5:
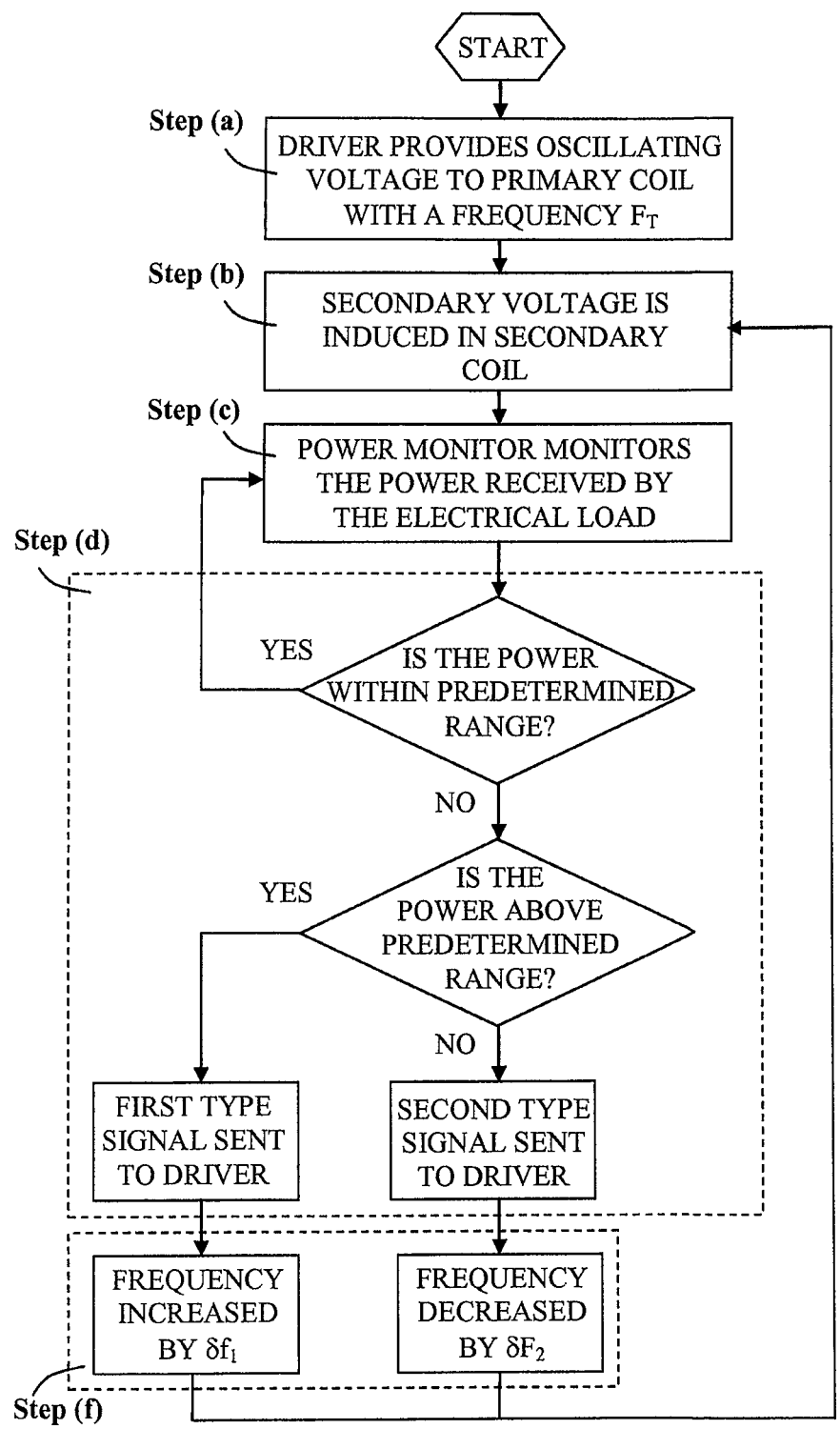
FIG. 5 is a flowchart showing a method for regulating power transfer by varying the power transmission frequency in an inductive power transfer system according to a further embodiment of the invention.

One example of a power regulation method using simple feedback signals is shown in the flowchart of FIG. 5. The method involves the following steps:

Step (a)—The driver 230 provides an oscillating voltage at a transmission frequency $f_t$ which is higher than the resonant frequency $f_R$ of the system.

Step (b)—A secondary voltage is induced in the secondary coil 320.

Step (c)—A power monitor in the secondary unit 300, monitors the power received by the electric load 340.

Step (d)—If the power received by the electric load 340 lies within a predetermined range then no action is taken. If the power received by the electric load 340 is below the predetermined range, then a feedback signal of a first type $S_a$ is sent to the driver. If the power received by the electric load 340 is above the predetermined range, then a feedback signal of a second type $S_b$ is sent to the driver.

Step (e)—A feedback signal is received by the driver 230.

Step (f)—If the received feedback signal is of the first type $S_a$, then the transmission frequency is increased by an incremental value $+\delta f_1$. If the received feedback signal is of the second type $S_b$, then the transmission frequency is decreased by an incremental value $-\delta f_2$.

It is noted that by using the power regulation method described above, when the power received by the load is too high, a series of feedback signals of the first type $S_a$ will be transmitted until the power is reduced into the acceptable range. Likewise when the power received by the load is too low, a series of feedback signals of the second type $S_b$ will be transmitted until the power is increased into the acceptable range. It is noted that the positive incremental value $\delta f_1$ may be greater than, less than or equal to the negative incremental value $\delta f_2$.

Alternatively, other power regulation methods using frequency adjustment may be used. For example, the operating parameters of the electric load may be monitored and their values may be transmitted to the power outlet via the communications channel 120. A processor in the power outlet may then calculate the required transmission frequency directly.

The method described hereabove, refers to a non-resonant transmission frequency lying within the linear region 8 (FIG. 2), higher than the resonant peak 2. It will be appreciated however that in alternative embodiments frequency-controlled power regulation may be achieved when the transmission frequency lies in the lower linear region of the resonance curve. Nevertheless, for certain embodiments, the selection of transmission frequencies in the higher linear 8 may be preferred, particularly where peak detection, as described above, is required.

Referring back to FIG. 1, various transmitters 122 and receivers 124 may be used for the communication channel 120. Where, as is often the case for inductive systems, the primary and secondary coils 220, 320 are galvanically isolated optocouplers, for example, may be used. A light emitting diode serves as a transmitter and sends encoded optical signals over short distances to a photo-transistor which serves as a receiver. However, optocouplers typically need to be aligned such that there is a line-of-sight between transmitter and receiver. In systems where alignment between the transmitter and receiver may be difficult to achieve, optocoupling may be inappropriate and alternative systems may be preferred such as ultrasonic signals transmitted by piezoelectric elements or radio signals such as Bluetooth, WiFi and the like. Alternatively the primary and secondary coils 220, 320 may themselves serve as the transmitter 122 and receiver 124.

In certain embodiments, an optical transmitter, such as a light emitting diode (LED) for example, is incorporated within the secondary unit 300 and is configured and operable to transmit electromagnetic radiation of a type and intensity capable of penetrating the casings of both the secondary unit 300, and the power outlet 200. An optical receiver, such as a photodiode, a phototransistor, a light dependent resistors of the like, is incorporated within the power outlet 200 for receiving the electromagnetic radiation.

Figure 6:
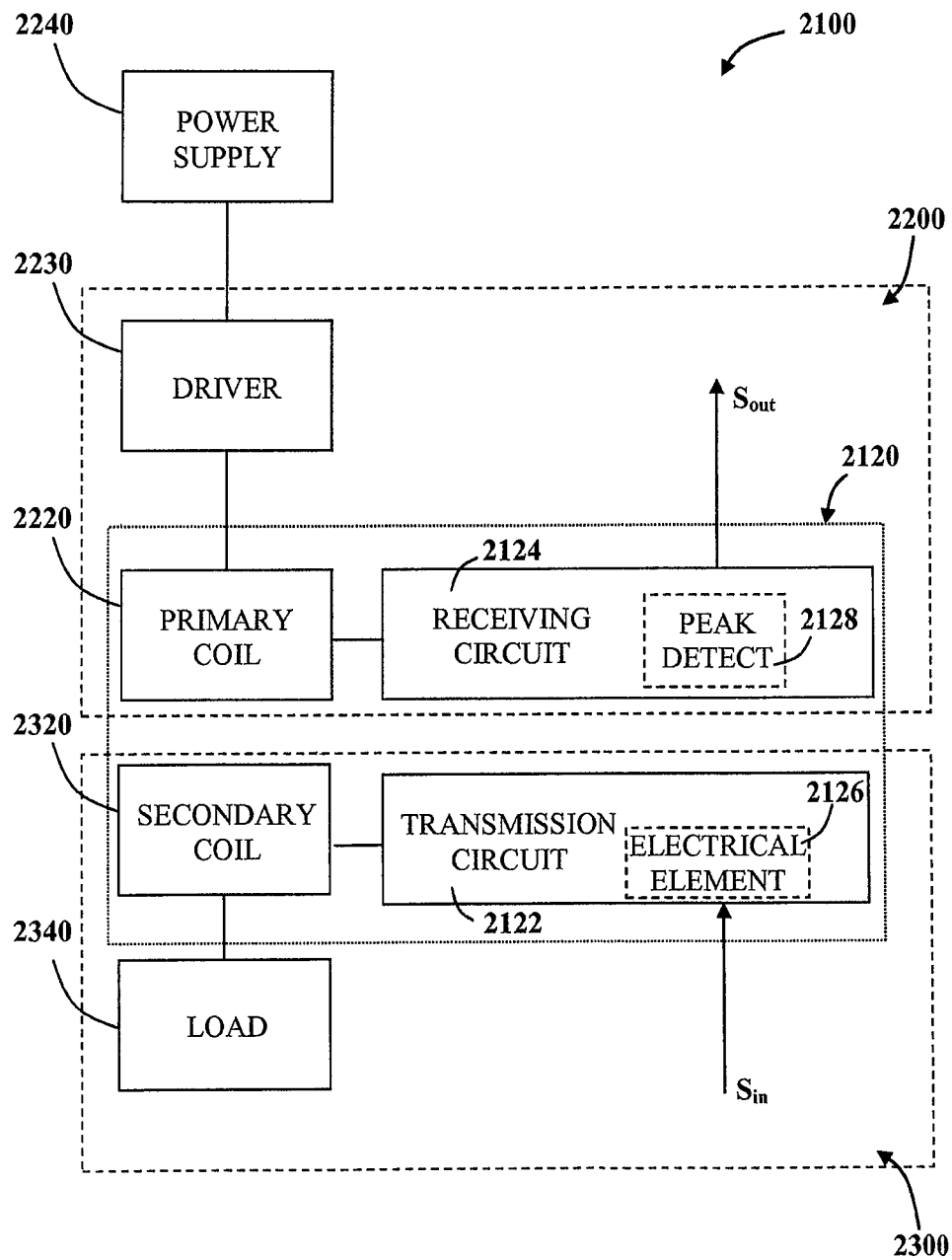
FIG. 6 is a block diagram showing the main elements of an inductive power transfer system with an inductive feedback channel according to still another embodiment of the present invention.

Reference to the block diagram of FIG. 6, it is a particular feature of certain embodiments of the invention that an inductive communications channel 2120 is incorporated into the inductive power transfer system 2100 for transferring signals between a inductive power outlet 2200 and a remote secondary unit 2300. The communication channel 2120 is configured to produce an output signal $S_{out}$ in the power outlet 2200 when an input signal $S_{in}$ is provided by the secondary unit 2300 without interrupting the inductive power transfer from the outlet 2200 to the secondary unit 2300.

The inductive power outlet 2200 includes a primary inductive coil 2220 wired to a power source 2240 via a driver 2230. The driver 2230 is configured to provide an oscillating driving voltage to the primary inductive coil 2220, typically at a voltage transmission frequency $f_t$ which is higher than the resonant frequency $f_R$ of the system.

The secondary unit 2300 includes a secondary inductive coil 2320, wired to an electric load 2340, which is inductively coupled to the primary inductive coil 2220. The electric load 2340 draws power from the power source 2240. Where the electric load 2340 requires a direct current supply, for example a charging device for an electrochemical cell or the like, a rectifier 2330 may be provided to rectify the alternating current signal induced in the secondary coil 2320.

An inductive communication channel 2120 is provided for transferring signals from the secondary inductive coil 2320 to the primary inductive coil 2220 concurrently with uninterrupted inductive power transfer from the primary inductive coil 2220 to the secondary inductive coil 2320. The communication channel 2120 may provide feedback signals to the driver 2230.

The inductive communication channel 2120 includes a transmission circuit 2122 and a receiving circuit 2124. The transmission circuit 2122 is wired to the secondary coil 2320, optionally via a rectifier 2330, and the receiving circuit 2124 is wired to the primary coil 2220.

The signal transmission circuit 2122 includes at least one electrical element 2126, selected such that when it is connected to the secondary coil 2320, the resonant frequency $f_R$ of the system increases. The transmission circuit 2122 is configured to selectively connect the electrical element 2126 to the secondary coil 2320. As noted above, any decrease in either the inductance L or the capacitance C increases the resonant frequency of the system. Optionally, the electrical element 2126 may be have a low resistance for example, with a resistance say under 50 ohms and Optionally about 1 ohm.

Typically, the signal receiving circuit 2124 includes a voltage peak detector 2128 configured to detect large increases in the transmission voltage. In systems where the voltage transmission frequency $f_t$ is higher than the resonant frequency $f_R$ of the system, such large increases in transmission voltage may be caused by an increase in the resonant frequency $f_R$ thereby indicating that the electrical element 2126 has been connected to the secondary coil 2320. Thus the transmission circuit 2122 may be used to send a signal pulse to the receiving circuit 2124 and a coded signal may be constructed from such pulses.

According to some embodiments, the transmission circuit 2122 may also include a modulator (not shown) for modulating a bit-rate signal with the input signal $S_{in}$. The electrical element 2126 may then be connected to the secondary inductive coil 2320 according to the modulated signal. The receiving circuit 2124 may include a demodulator (not shown) for demodulating the modulated signal. For example the voltage peak detector 2128 may be connected to a correlator for cross-correlating the amplitude of the primary voltage with the bit-rate signal thereby producing the output signal $S_{out}$.

In other embodiments, a plurality of electrical elements 2126 may be provided which may be selectively connected to induce a plurality of voltage peaks of varying sizes in the amplitude of the primary voltage. The size of the voltage peak detected by the peak detector 2128 may be used to transfer multiple signals.

Figure 7:
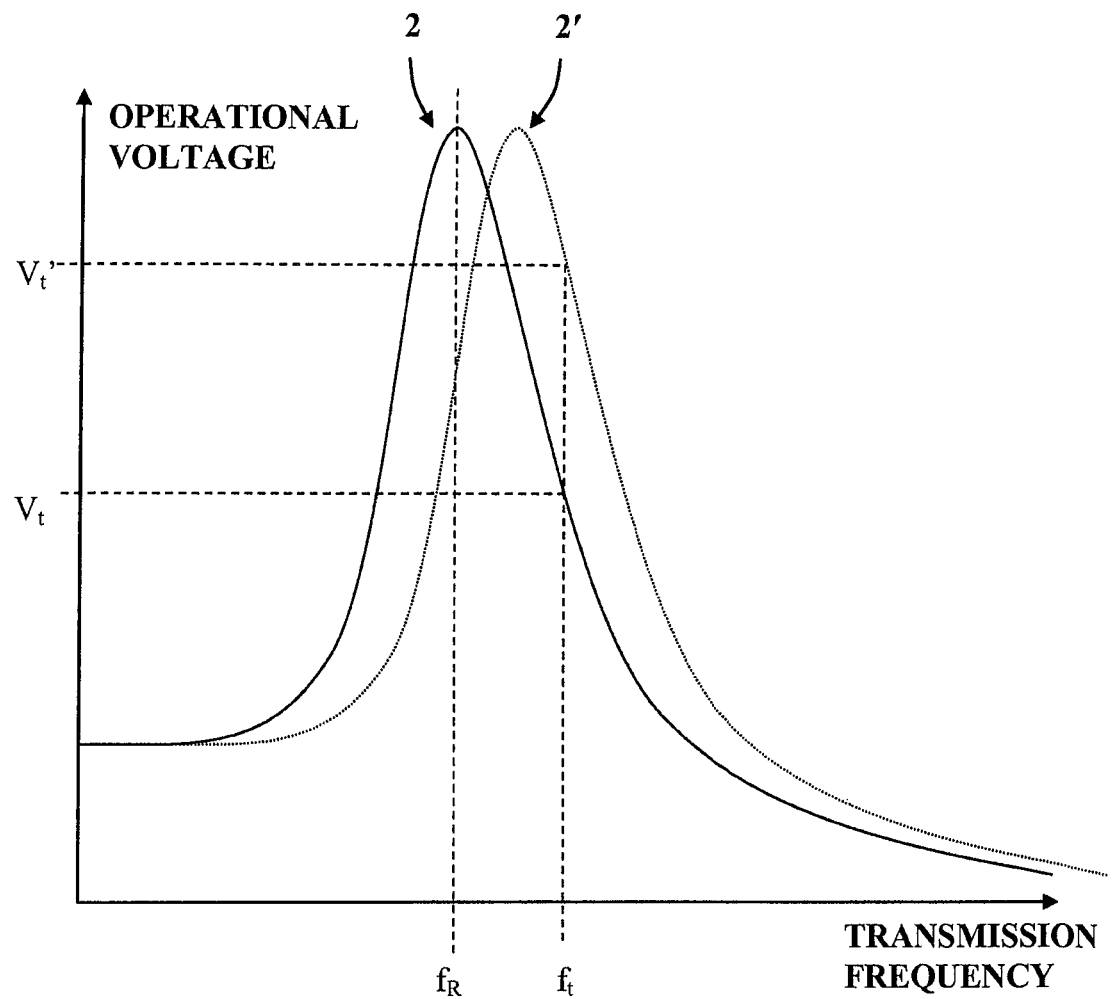
FIG. 7 is a graph showing how the variation of operational voltage with transmission frequency is effected by changes in resonant frequency of the system.

FIG. 7 is a graph showing how the amplitude of the operational voltage varies according to the transmission frequency. It is noted that the voltage is at its highest when the transmission frequency is equal to the resonant frequency $f_R$ of the system, this maximum amplitude is known as the resonance peak 2. If the resonant frequency $f_R$ of the system increases, a new resonance peak 2' is produced.

According to another embodiment of the invention, an inductive power transfer system 2100 operates at a given transmission frequency $f_t$ which is higher than the resonant frequency $f_R$ of the system. The normal operating voltage $V_t$ is monitored by the voltage peak detector 2128. When the electric element 2126 is connected to the secondary inductive coil 2320 the resonant frequency of the system increases. Therefore, the operating voltage increases to a higher value $V_t'$. This increase is detected by the voltage peak detector 2128.

It is noted that in contradistinction to prior art inductive signal transfer systems such as described in U.S. Pat. No. 5,455,466 to Terry J. Parks and David S. Register, the present invention enables data signals to be transferred from the secondary coil 2320 to the primary coil 2220 concurrently with inductive transfer of power from the primary coil 2220 to the secondary coil 2320. Consequently, the signal transfer system may be used to provide feedback signals for real time power regulation.

Figure 8:
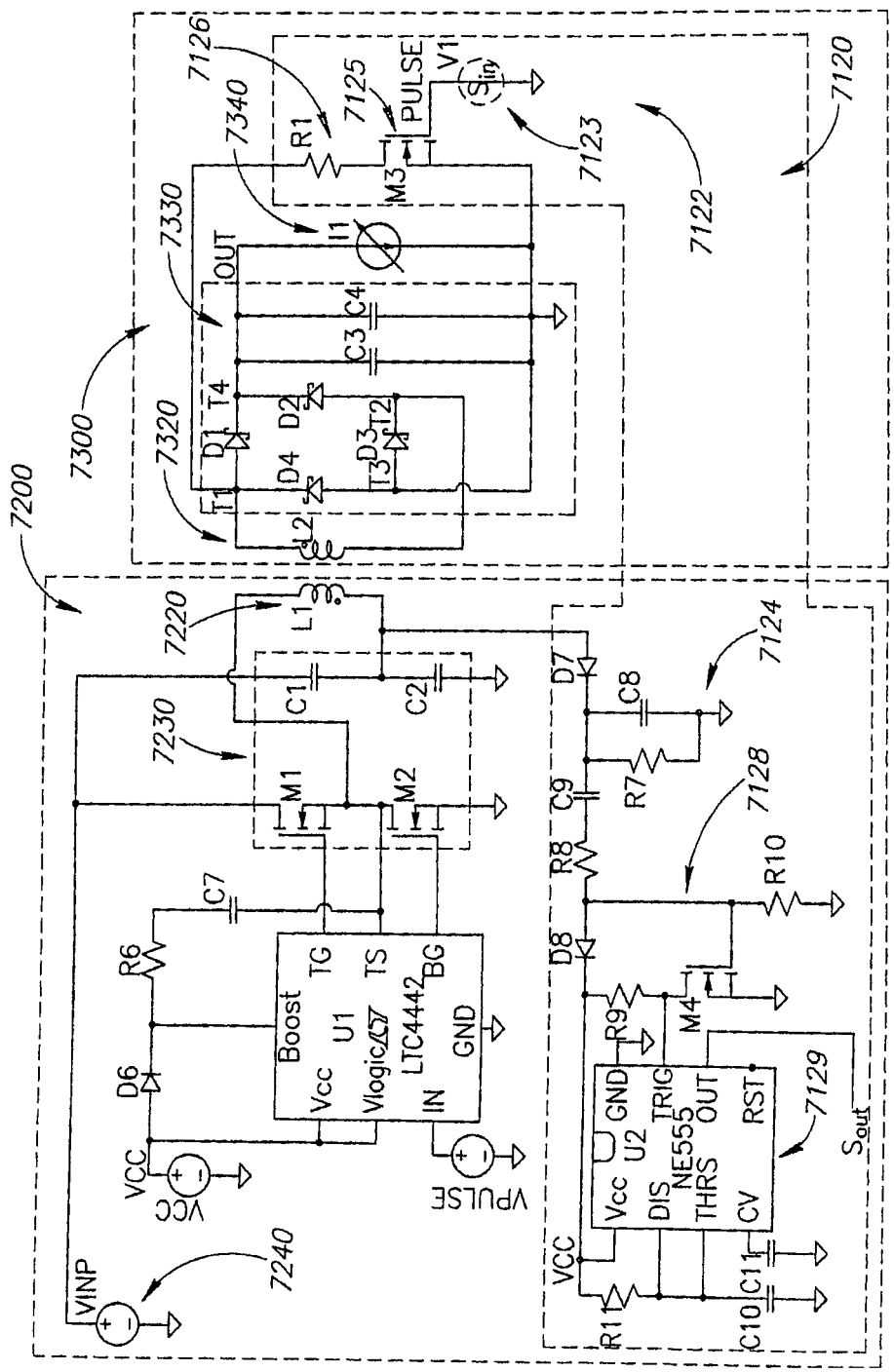
FIG. 8 is a circuit diagram of an inductive power transfer system including an inductive feedback channel for providing coil-to-coil signal transfer concurrently with uninterrupted inductive power transfer between the coils in accordance with yet another embodiment of the invention.

FIG. 8 shows an exemplary circuit diagram of an inductive power outlet 7200 and a secondary unit 7300, according to another embodiment of the invention. An inductive feedback channel 7120 is provided for transferring signals between the coils concurrently with uninterrupted inductive power transfer.

The inductive power outlet 7200 comprises a primary coil 7220 driven by a half-bridge converter 7230 connected to a power source 7240. The half-bridge converter 7230 is configured to drive the primary coil 7220 at a frequency higher than the resonant frequency of the system. The secondary unit 7300 comprises a secondary coil 7320 wired to the input terminals $T_1$, $T_2$ of a rectifier 7330, and an electric load 7340 wired to the output terminals $T_3$, $T_4$ of the rectifier 7330.

The inductive feedback channel 7120 comprises a transmission circuit 7122, in the secondary unit 7300 and a receiving circuit 7124 in the inductive power outlet 7200. The transmission circuit 7122 comprises an electrical resistor 7126 connected to the rectifier 7330 via a power MOSFET switch 7125. A modulator 7123 may provide an input signal $S_{in}$ to the power MOSFET 7125.

It is noted that in this embodiment the transmission circuit 7122 is wired to one input terminal $T_1$ and one output terminal $T_3$ of the rectifier 7330. This configuration is particularly advantageous as, even when the transmission circuit 7122 is connected, the resistor 7126 only draws power from the system during one half of the AC cycle, thereby significantly reducing power loss.

The receiving circuit 7124 includes a voltage peak detector 7128 that is configured to detect increases in the transmission voltage, and a demodulator 7129 for producing an output signal $S_{out}$.

Figure 9:
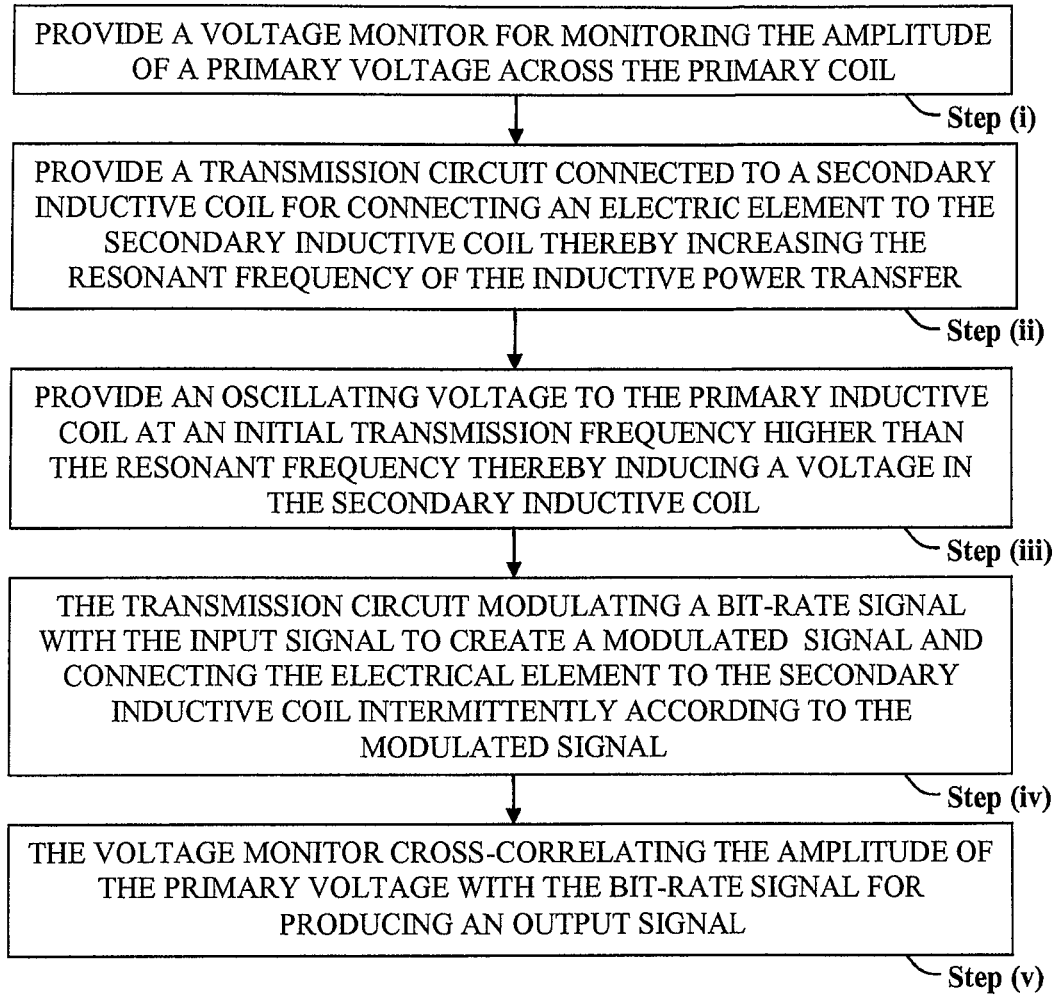
FIG. 9 is a flowchart showing a method for inductively transferring a signal from the secondary inductive coil to a primary inductive coil of an inductive power transfer system according to still a further embodiment of the invention.

With reference now to FIG. 9, a flowchart is presented showing the main steps in a method for transferring a signal from the secondary inductive coil to a primary inductive coil of an inductive power transfer system. The method includes the following steps:

Step (i)—connecting the primary inductive coil to a voltage monitor for monitoring the amplitude of a primary voltage across the primary coil;

Step (ii)—connecting the secondary inductive coil to a transmission circuit for selectively increasing the resonant frequency of the inductive power transfer system;

Step (iii)—providing an oscillating voltage to the primary inductive coil at an initial transmission frequency higher than the resonant frequency thereby inducing a voltage in the secondary inductive coil;

Step (iv)—using the transmission circuit to modulate a bit-rate signal with the input signal to create a modulated signal and connecting the electrical element to the secondary inductive coil intermittently according to the modulated signal, and Step (v)—using the voltage monitor to cross-correlate the amplitude of the primary voltage with the bit-rate signal for producing an output signal.

Therefore, the inductive communication channel 2120 may be used to transfer a feedback signal from the secondary inductive coil to the primary inductive coil for regulating power transfer across an inductive power coupling as described above.

It will be appreciated that embodiments of the present invention may be useful in a wide range of applications. Inductive power receivers may be used to wirelessly provide power for a variety of electrical devices. Embodiments of the present invention may be integrated into such inductive power receivers. In particular, because non-resonant transmission uses lower transmission voltages, heat loss from the non-resonant system is lower. Thus embodiments of the current invention may be of particular use when incorporated within high power applications such as power tools, kitchen appliances, bathroom appliances, computers, media players, office equipment and the like.

The reduced heat loss, associated with embodiments of the non-resonant systems of the invention, is particularly useful when heat dissipation is difficult for example when power receiver has small dimensions or for heat-sensitive equipment such as measuring devices. Also, it is desirable that devices implanted into a living body do not dissipate large amounts of heat into the body. Therefore, non-resonant inductive transfer is well suited to implanted devices, such as pace makers, trackers and the like.

It is also noted that in recent years public concern about the threat of a global energy crisis has resulted in a greater emphasis being placed upon optimizing the efficiency of energy transfer. It is difficult to achieve more demanding specifications using existing technology and, in this context, embodiments of the present invention may be used to provide high powers with very low energy losses. Consequently the current invention is an important element in the drive for greater efficiency.

Furthermore embodiments of the present invention may be advantageously utilized in inductive power transfer systems in any of the various applications in which power is transferred from a primary coil to a remote secondary coil. Amongst others, such applications include:

inductive chargers for use charging electronic devices, inductive power adaptors for powering electronic devices such as computers, televisions, kitchen appliances, office equipment and the like, medical applications in which power is transferred remotely to devices implanted in a patient, communications with remote RFID tags, military application in which power is transferred across thick armored plating, communication or inductive energy transfer to secondary inductive coils buried underground.

communication or inductive energy transfer to secondary inductive coils submerged under water, for example in submarine applications, and communication or inductive energy with secondary coils which are moving relative to the primary coil.

Thus, by using a transmission voltage oscillating at a frequency different from the resonant frequency of the system, the inductive transfer system has a higher tolerance to environmental fluctuations and variations in inductive coil alignment than other transfer systems and the frequency may be used to regulate power transfer. Moreover, when the transmission frequency is higher than the resonant frequency of the system, a peak detector may be used to indicate hazards and provide an inductive communication channel.

Energy Efficient Inductive System

Figure 10A:
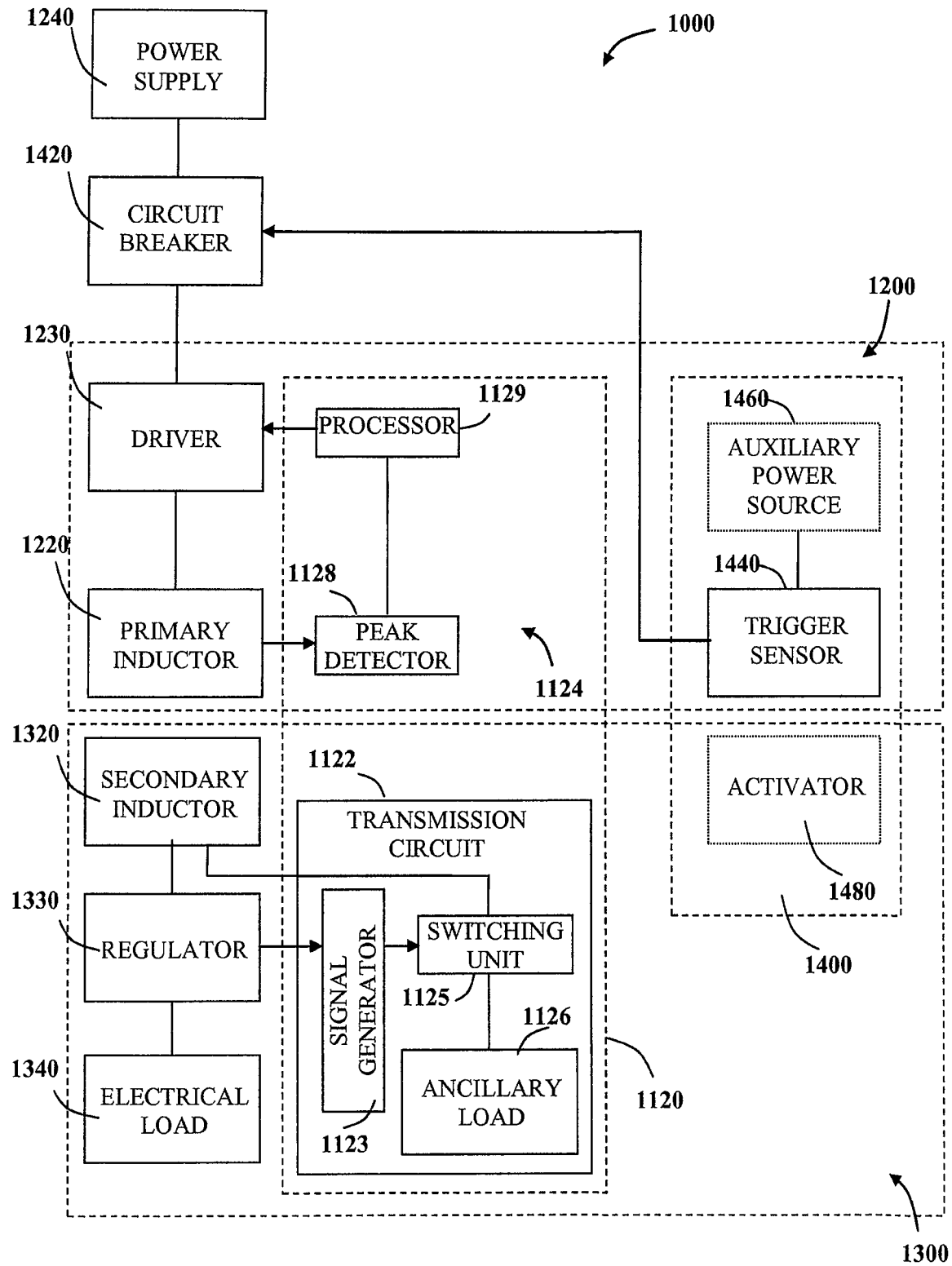
FIG. 10A is a block diagram representing selected components of an energy efficient inductive power transfer system incorporating activation and termination mechanisms.

Reference is now made to the block diagram of FIG. 10A representing selected components of an embodiment of an energy efficient inductive power transfer system 1000. The inductive power transfer system 1000 includes an inductive power outlet 1200 and an inductive power receiver 1300 and is configured to switch between transmission mode and standby mode.

In standby mode, the system 1000 may be dormant with the inductive power outlet 1200 and inductive power receiver 1300 waiting for an activation signal before transitioning to transmission mode. In transmission mode, the inductive power system 1000 is configured and operable to draw power from a power supply 1240, such as a mains electricity supply, a vehicle battery, a power generator, fuel cell or the like, to an electric load 1340.

It will be appreciated, that such an inductive power transfer system 1000 may significantly reduce power losses associated with prior art power transfer systems. During the standby mode little or no power may be drawn from the power supply 1240. The inductive power outlet 1200 may be configured to switch to transmission mode only in the presence of a suitable inductive power receiver 1300. Furthermore, the system 1000 may be operable to revert to standby mode when no power need be transferred, for example when the inductive power receiver 1300 is removed or the electric load 1340 requires no further power. Thus power is only drawn by the system 1000 when actually required. Various activation and termination protocols may be used with the system, such as described hereinbelow.

Figure 10B:
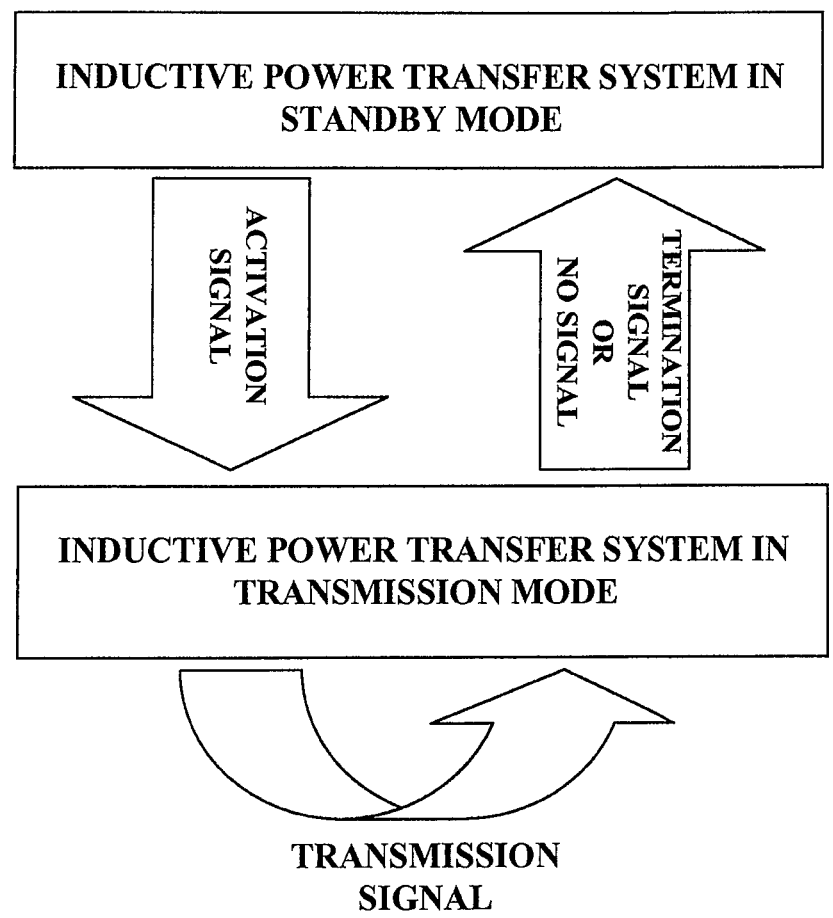
FIG. 10B is a flowchart representing transition between standby mode and transmission mode for activating and terminating an energy efficient inductive power transfer system.

Referring now to the flowchart of FIG. 10B, the inductive power transfer system 1000 may switch between standby mode and transmission mode by a number of pathways. When in standby mode, the inductive power outlet 1200 or the inductive power receiver 1300 may be configured to wait for an activation signal. If such an activation signal is received, the system 1000 may switch to transmission mode. Where appropriate, activation of the system 1000 may involve an initial trigger signal activating the inductive power outlet 1200 and an authentication process confirming the presence of a suitable inductive power receiver 1300.

When in transmission mode, the inductive power transfer system 1000 may be configured to periodically transfer signals between the inductive power receiver 1300 and the inductive power outlet 1200, such as described hereinabove in relation to FIG. 5, for example.

As detailed below, various transmission signals may be used with the system, for example, instructions may be sent from the inductive power receiver 1300 to the inductive power outlet 1200 to increase power by a certain interval, to decrease power by a certain interval, to maintain the same power, to terminate power transfer or the like. Where no such transmission signals are received, the inductive power outlet 1200 may be configured to stop driving the primary inductor 1220 and to revert to the standby mode.

In particular, the inductive power transfer system 1000 may be configured to revert to standby mode when a termination signal is transferred between the inductive power receiver 1300 and the inductive power outlet 1200. Where appropriate, the inductive power receiver 1300 may be configured to send a termination signal to the inductive power outlet 1200 when the electric load 1340 no longer requires power. For example, where the electric load 1340 is an electrochemical cell being charged by an inductive charger, say, a termination signal may be generated when the electrical cell is fully charged.

It will be appreciated that an inductive power transfer system such as disclosed herein may reduce significantly the amount of power drawn by dormant power adaptors, chargers and the like.

Referring back to FIG. 10A, the system 1000 may include a trigger mechanism 1400 and a signal transfer mechanism 1120. The trigger mechanism 1400 may be used while the inductive power transfer system 1000 is in the standby mode, to provide an initial trigger to generate an activation signal such that the inductive power transfer system 1000 switches to transmission mode. The signal transfer mechanism 1120 may provide a channel for the inductive power receiver 1300 to send instruction signals, such as identification signals, authentication signals, transmission signals, termination signals or the like to the inductive power outlet 1200.

The inductive power outlet 1200 of the inductive power transfer system 1000 includes a primary inductor 1220 such as a primary inductive coil, for example, connectable to the power supply 1240 via a driver 1230. The driver 1230 provides the electronics necessary for supplying an oscillating voltage to the inductive coil 1220. The inductive power receiver 1300 typically includes a secondary inductor 1320, such as a secondary inductive coil, a regulator 1330 and an electrical load 1340.

The secondary inductive coil 1320 is configured to inductively couple with the primary inductive coil 1220 of the inductive power outlet 1200. Where required, the regulator 1330 may include a rectifier to convert alternating current induced across the secondary coil 1320 to a direct current signal for supplying the electrical load 1340. A rectifier 1330 may be necessary, for example, where the electrical load 1340 comprises an electrochemical cell to be charged.

The trigger mechanism 1400 may control the connection between the power supply 1240 and the inductive power outlet 1200. The trigger mechanism 1400 may include a circuit breaker 1420 and a trigger sensor 1440. Optionally, trigger mechanism 1400 may further include an auxiliary power source 1460 for providing power when the inductive power outlet 1200 is disconnected from its power supply 1240. Various auxiliary power sources 1460 may be used in embodiments of the trigger mechanism 1400 such as electrochemical cells, capacitors and the like, which may be configured to store energy while the inductive power outlet 1200 is connected to the power supply 1240 for use when the inductive power outlet 1200 is disconnected. Still other auxiliary power sources may include electricity generating elements such as solar cells, piezoelectric elements, dynamos or the like.

The circuit breaker 1420 may be configured to receive a disabling signal from the trigger and in response to provide an electrical connection between the power supply 1240 and the inductive power outlet 1200. Various circuit breakers 1420 may be used to disconnect the inductive power outlet 1200 from the power supply 1240 as suit requirements. For example, an electronic switch may be provided such as a Metal-Oxide Semiconductor Field-Effect Transistor (MOSFET) or the like the gate terminal of which may be configured to receive the electrical signals sent by the trigger sensor 1440. Other circuit breakers may include for example, a single pole switch, a double pole switch, a throw switch or the like.

The trigger sensor 1440 is configured to detect a release signal indicating the proximity of a possible inductive power receiver 1300. The trigger 1440 may be further configured to disable the circuit breaker 1420 when the release signal is detected. Optionally, an activator 1480 incorporated into the inductive power receiver 1300 is configured to produce the release signal which is detectable by the trigger 1440.

In one embodiment the trigger mechanism 1400 may include a magnetic detector such as a Hall Effect switch, reed switch or the like. The magnetic switch may be configured to detect an increase in magnetic field as a result of the approach of an activating magnetic element associated with the inductive power receiver 1300. It will be appreciated that a Hall Effect switch may be configured to detect the approach of an alignment magnet associated with the inductive power receiver 1300 which further functions as the activating magnetic element 1480 for the trigger mechanism 1400. It will be further appreciated that other magnetic switches may be used in other embodiments of the trigger mechanism as will occur to the skilled practitioner. Still other embodiments of the trigger mechanism may be used, for example, as described in the applicants co-pending patent application PCT/IL2010/001013 which is incorporated herein by reference.

The signal transfer system 1120 may include an inductive feedback channel 7120 such as described hereinabove in relation to FIG. 8. The regulator 1330 of the inductive power receiver may be in communication with a transmission circuit 1122 including a signal generator 1123, a switching unit 1125 and an ancillary load 1340. The signal generator 1123 may be a modulator 7123 such as described in FIG. 8. The switching unit 1125 may be a MOSFET 7125 such as described in FIG. 8. Variously, the ancillary load 1126 may be an electrical resistor 7126 such as described in FIG. 8, although other electrical elements such as capacitors, inductors and the like may alternatively or additionally serve as the ancillary load 1126. The transmission circuit 1122 may thus modulate the power drawn by the secondary inductor 1320. The modulated power may be detected by a signal detector 1124 associated with the inductive power outlet 1200.

The inductive power outlet 1200 includes a signal detector 1124 comprising a peak detector 1128 and a processor 1129. The peak detector 1128 may be configured to detect peaks in primary voltage across the primary inductor or primary current supplied to the primary inductor. Thus, the peak detector 1128 may be able to detect when the ancillary load is connected to the secondary inductor 1320. The processor 1129, such as the demodulator 7129 described above in relation to FIG. 8, may be provided to determine the frequency of peak pulses.

The signal transfer system 1120 may be used to transmit instruction signals such as identification signals, authentication signals, transmission signals, termination signals or the like to the inductive power outlet 1200 in the form of peak pulses having characteristic frequencies.

The regulator 1330 of the inductive power receiver 1300, which may include a controller, rectifier, capacitors, microcontroller, voltage monitor or the like, is in communication with the transmission circuit 1122.

The regulator 1330 may be operable to monitor induced secondary voltage across the secondary inductor 1320 and to compare the induced voltage with reference values. By comparing the secondary voltage with threshold values, the regulator 1330 may determine whether the secondary voltage lies within a permissible range of values. Accordingly, instruction signals may be selected by the regulator 1330 and generated by the transmission circuit 1122 instructing the inductive power outlet 1200 to adjust the induced voltage across the secondary inductor 1320.

It will be appreciated that in standby mode no voltage is induced across the secondary inductor 1320. As outlined in greater detail below, in standby mode, the regulator 1320 and transmission circuit 1122 may be further operable to respond to an activation voltage pulse induced across secondary inductor 1320 by generating an identification instruction signal (ID signal). The ID signal may be detected by the inductive power outlet 1200 thereby confirming the presence of the inductive power receiver 1300 and optionally its required operating parameters.

Figure 11A:
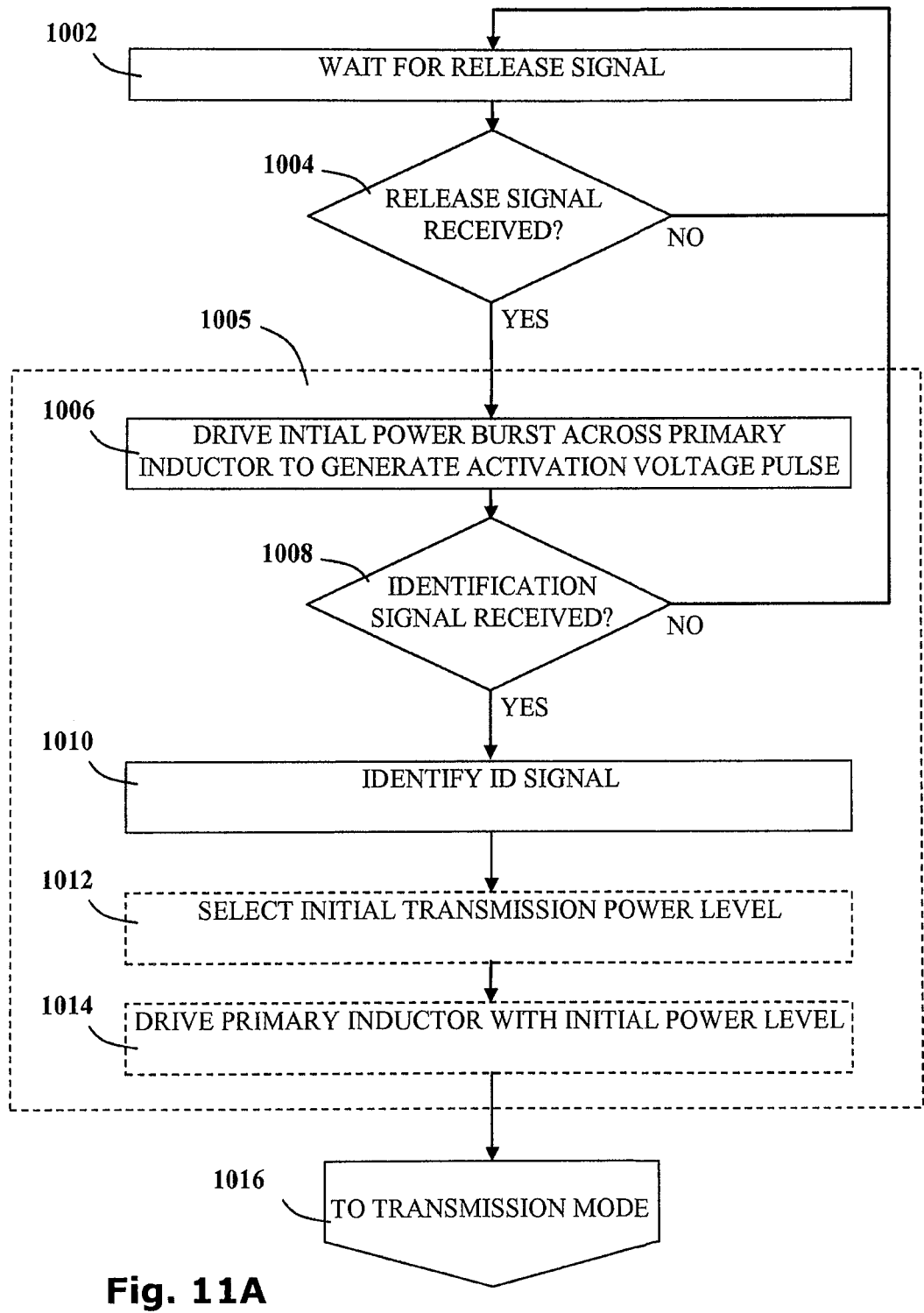
FIG. 11A is a flowchart representing selected stages of a possible protocol for transition from standby phase to the transmission phase in the inductive power outlet of an energy efficient inductive power outlet.

Reference is now made to FIG. 11A showing selected stages of a possible protocol for transition from standby phase to the transmission phase in the inductive power outlet. In standby phase, the dormant inductive power outlet waits for a release signal 1002.

The release signal indicates to the inductive power outlet that a compatible inductive power receiver may have been placed within transmission range. Such a release signal may be inter alia a change in local magnetic field associated with a trigger magnet in the inductive power receiver. Accordingly in one embodiment the inductive power outlet incorporates a Hall switch which is configured to detect changes in the local magnetic field. Other release signal mechanisms will occur to those skilled in the art such as signals detectable using piezoelectric elements, light sensors, audio sensors and the like as suit requirements.

If no release signal is received the outlet remains in standby mode 1004. When a release signal is detected by the outlet an authentication process 1005 is initiated during which the presence of the inductive power receiver is confirmed. The authentication process may start by the driver of the primary inductor producing an initial power of sufficient intensity to induce an activation voltage pulse across the secondary inductor of the inductive power receiver 1006. For example, a primary voltage may be driven across the primary inductor such that an activation voltage pulse of eight volts is induced across the secondary inductor.

The inductive power outlet may be operable to detect an ID signal in response to the initial power burst 1008. If the inductive power outlet receives an ID signal response from a recognized inductive power receiver, then the ID signal may be identified 1010 and the mode switched to transmission mode 1016. Optionally, depending upon the identity of the ID signal, an initial transmission power level may be selected 1012 according to what ID signal is received and the primary inductor driven with the initial transmission power level 1014. Alternatively, the initial transmission power level may be the transmission power level of the initial power burst.

Optionally, the initial power burst across the primary inductor may be repeated for a fixed number of iterations before the inductive power outlet reverts to standby mode. Variously, the driving voltage of the initial power burst may be constant or changing. According to one embodiment, the driver of the inductive power outlet may be operable to produce an initial 15 millisecond burst of oscillating voltage across which may repeated, say every 256 milliseconds or so. After five iterations or so, if no ID signal is received, the inductive power outlet may revert to standby mode.

Various ID signals may be used in embodiments of the present disclosure, for example, where the inductive power outlet includes a peak detector, as described hereinabove, a transmission circuit may be used to modulate the primary voltage across the primary inductor, or primary current drawn by the primary inductor, with peak pulses having characteristic frequencies which are identifiable as generated by recognized inductive power receivers. In one embodiment, ID signals may peak pulses having characteristic frequencies selected from 500 hertz, 1 kilohertz and 8 kilohertz. The selected characteristic frequency of the ID signal may provide further instructions to the inductive power outlet for example relating to required transmission parameters, user specific data, billing information or the like.

The power level of the induced voltage may be regulated by adjusting a variety of parameters of the driving voltage. For example, where non-resonant power transmission is used, such as described hereinabove, the power level may be determined by the selected operating frequency. Optionally, the initial voltage across the primary inductor may be steadily increased by decreasing the driving frequency from 476 kilohertz to 313 kilohertz during the initial burst. Alternatively, a the power level may be selected by adjusting the duty cycle or amplitude of the driving voltage.

Figure 11B:
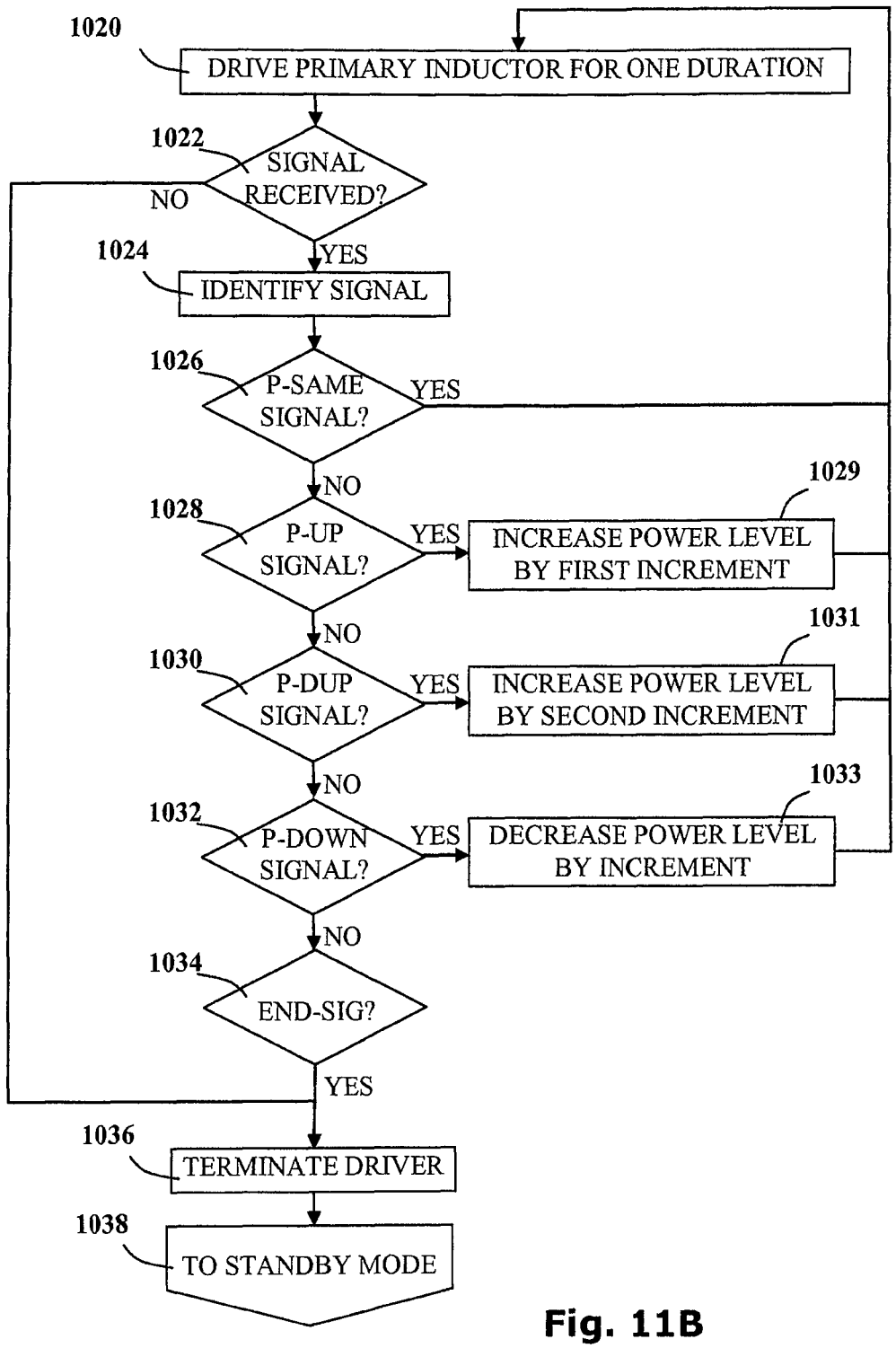
FIG. 11B is a flowchart representing a possible transmission mode protocol for an inductive power outlet.

Reference is now made to FIG. 11B representing a possible transmission mode protocol for use with an inductive power outlet. Optionally, such a protocol may be initiated by the transition protocol of FIG. 11A, alternatively an inductive power outlet may be activated in other ways, such as by manually operating a power switch, connecting to a mains power supply or the like.

In transmission mode, the inductive power outlet may be operable to drive the primary inductor for a limited time duration 1020, for example for 10 milliseconds or so. At the end of the limited time duration, the outlet may be operable to terminate the operation 1036 unless an instruction signal is received 1022. Such a system may enable an energy efficient inductive power outlet to draw power only when required and to shut down when not needed. If an instruction signal is received from the inductive power receiver, the signal may be identified 1024 and acted upon, for example, as follows:

- if a perpetuation signal P-SAME is received from the inductive power receiver 1026, then the driver may continue to drive the primary inductor for a further duration;
- if a first power increase signal P-UP is received from the inductive power receiver 1028, then the driver may increase the power level by a first incremental value 1029;
- if a second power increase signal P-DUP is received from the inductive power receiver 1030, then the driver may increase the power level by a second incremental value 1031;
- if a power decrease signal P-DOWN is received from the inductive power receiver 1032, then the driver may decrease the power level by an incremental value 1033; or
- if a termination signal END-SIG is received from the inductive power receiver 1034, then the driver may be terminated 1036, thereby ceasing to drive the primary inductor and the inductive power outlet reverting to standby mode.

To better explain the transmission protocol and for illustrative purposes only, an example of the protocol is described below in which the inductive power outlet drives a non-resonant transmission voltage. The protocol may also be applicable to resonant transmission systems.

The instruction signals may comprise modulated peak pulses with each signal having a characteristic frequency. In one particular embodiment the perpetuation signal P-SAME may have a characteristic frequency of 500 hertz, the first power increase signal P-UP may have a characteristic frequency of 8 kilohertz, the second power increase signal P-DUP may have a characteristic frequency of between 1.5 and 5 kilohertz, the termination signal END-SIG may have a characteristic frequency of 250 hertz. It will be appreciated that other characteristic frequencies may alternatively be used. Indeed, where required, other instruction signals, such as additional power decrease signal, for example, may be additionally or alternatively transferred as suit requirements.

Referring again to FIG. 2, as noted above, where the transmission frequency is selected from the non-resonant region 8 above the resonant frequency of the system the output power of the secondary inductor may be regulated by increasing or decreasing the driving frequency by incremental amounts. According to one embodiment in which the transmission frequency is around 10 megahertz the incremental frequency steps 6f may be selected from within a permissible range of 277 kilohertz to 357 kilohertz or so.

In one system the driver 1230 (FIG. 10) of the inductive power outlet may include a microcontroller unit operable to calculate the incremental frequency value $f_{op+1}-f_{op}$ according to the formula:

$$f_{op+1} - f_{op} = \frac{F_{sys}}{\text{divider value}} - \frac{F_{sys}}{\text{divider value} - 1}$$

where $F_{sys}$ is the transmission frequency of the driver, and the divider value is an integer value. Where required, different incremental values may be used for increasing and decreasing the voltage or power.

As noted, two power increase signals P-UP and P-DUP may request different incremental power increases. Accordingly the second power increase signal P-DUP may be used to step up power by larger increments, say twice the size of the standard increments. This may be useful for example where the initial voltage is particularly low.

Figure 11C:
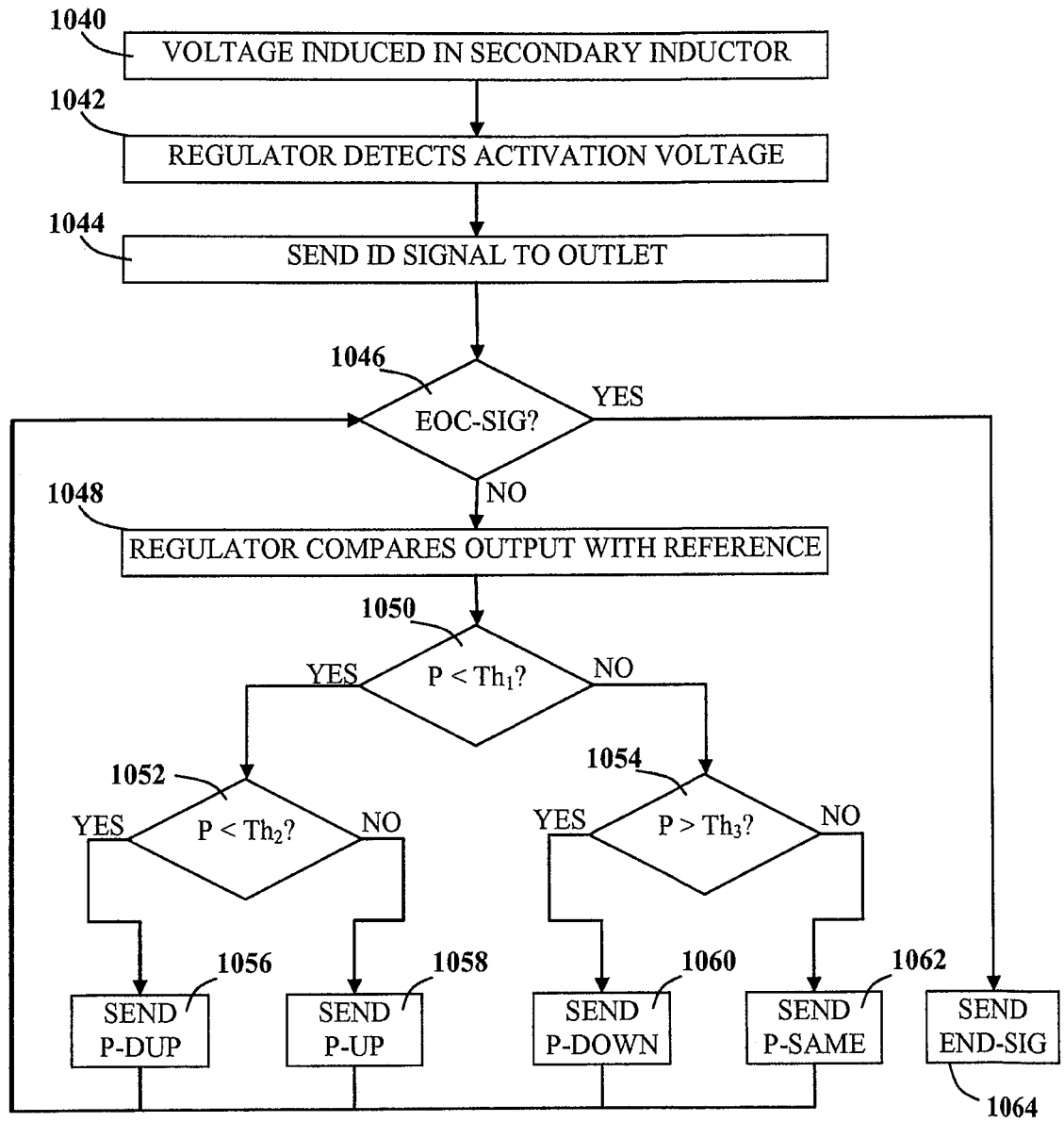
FIG. 11C is a flowchart representing operation of an energy efficient inductive power receiver.

Turning now to the inductive power receiver, reference is made to FIG. 11C showing possible operational steps during inductive power reception. The inductive power receiver may be activated when a voltage is induced across the secondary inductor 1040, when the regulator may detect the activation voltage 1042 an identification signal may be sent to the inductive power outlet 1044.

Such an identification signal (ID signal) may serve to switch the inductive power transmitter to transmission mode as described above in relation to FIG. 11A. For example, an induced voltage of about 8V and producing a current of about 3 milliamps and lasting about 5 milliseconds or so, may power a microcontroller associated with the regulator to activate the sending of an ID signal to the inductive power outlet. In one embodiment, a transmission circuit 1122 (FIG. 10) may be used to produce a modulated peak pulse having a characteristic frequency selected from 500 hertz, 1 kilohertz, 8 kilohertz or the like. Variously, the inductive power receiver may select an ID signal such that predetermined transmission parameters may be selected for operating the inductive power outlet.

It is noted that during power transfer, the inductive power receiver is operable to periodically send instruction signals to the inductive power outlet. The instruction signals may be selected according to various factors as outlined below.

Where, the inductive power receiver is operable to detect an end-of-charge command EOC-SIG indicating that the electric load, such as an electrochemical cell or the like, requires no more power 1046. If such an end-of-charge command is detected, the inductive power receiver may be operable to send a termination signal END-SIG to the inductive power transmitter 1064. As outlined above in relation to FIG. 11B, the termination signal instruct the inductive power outlet to revert to standby mode. According to one embodiment, the termination signal may comprise a modulated peak pulse having a characteristic frequency of 250 hertz. It will be appreciated that such a termination mechanism may enable an energy efficient inductive power transfer system to draw power only when required and to shut down when not needed thereby reducing energy wastage.

If no end-of-charge command is detected, the regulator may be configured to compare the output of the secondary inductor to at least one reference value 1048. For example, the regulator may compare secondary voltage to reference values stored in a memory element. Alternatively, reference values may be calculated by a processor associated with the inductive power receiver to suit requirements.

If the power is below a first lower threshold value $Th_1$ 1050, a first power increase signal P-UP may be sent to the inductive power outlet 1058. The regulator may further compare the power to a second threshold value $Th_2$ 1052, if the power is also lower than the second threshold value $Th_2$ a second power increase signal P-DUP may be sent to the inductive power outlet 1056.

Where the power is above the first lower threshold value, the power may be compared to at least one an upper threshold value $Th_3$ 1054. If the power level is greater than the upper threshold value $Th_3$, then a power decrease signal P-DOWN may be sent to the inductive power outlet 1060.

It is particularly noted that where the power level is neither greater than the upper threshold value $Th_3$ nor lower than the lower threshold value $Th_1$, then a perpetuation signal P-SAME may be sent to the inductive power outlet 1062. Thus when even when no action is required a signal is sent at least one instruction signal may be sent to the inductive power outlet during each time duration. Accordingly, the inductive power receiver may periodically indicate its continued presence to the inductive power outlet. It will be appreciated that when the inductive power receiver is removed from the inductive power outlet, no instruction signals will be passed therebetween. As indicated above in relation to FIG. 11B, the inductive power outlet may be configured to shut down when no such signal is received.

Although only five instruction signals are described hereinabove, other instruction signals may be additionally be transferred as required. Various instructions may occur to those skilled in the art, for example indicating that the power is outside still further threshold values, requesting greater power resolution or such like.

The scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

What is claimed is:

1. An inductive power outlet, having a primary inductor, for wirelessly powering a power receiver, the inductive power outlet comprising:
   a signal receiving circuit comprising:
   a peak detector configured to detect voltage, current peaks, or voltage and current peaks in the primary inductor; and
   a processor having a demodulator, the demodulator configured to determine frequencies of the peaks,
   wherein the power outlet is configured to either shut down or issue a warning indicating hazardous scenario if a peak of the peaks exceeds a normal operating voltage by the peak detector, and wherein the processor is configured to detect signals of the power receiver based on the frequencies.

2. The inductive power outlet of claim 1, wherein the signal receiving circuit is configured to produce an output signal that corresponds to the signals of the power receiver, wherein the signals comprise information about the power receiver.

* * * * *